(12) United States Patent
Spears

(10) Patent No.: US 12,327,259 B2
(45) Date of Patent: *Jun. 10, 2025

(54) SYSTEMS AND METHODS FOR DYNAMIC MANAGEMENT OF GEO-FENCED AND GEO-TARGETED MEDIA CONTENT AND CONTENT ALTERNATIVES IN CONTENT MANAGEMENT SYSTEMS

(71) Applicant: IPAR, LLC, San Francisco, CA (US)

(72) Inventor: Joseph L. Spears, Hayward, CA (US)

(73) Assignee: IPAR, LLC, San Francisco, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 17/494,889

(22) Filed: Oct. 6, 2021

(65) Prior Publication Data

US 2022/0027925 A1    Jan. 27, 2022

Related U.S. Application Data

(63) Continuation of application No. 12/697,004, filed on Jan. 29, 2010, now Pat. No. 11,157,919.

(51) Int. Cl.
    *G06Q 30/02*    (2023.01)
    *G06F 16/29*    (2019.01)
    *G06F 16/958*   (2019.01)
(52) U.S. Cl.
    CPC .......... *G06Q 30/02* (2013.01); *G06F 16/29* (2019.01); *G06F 16/958* (2019.01)
(58) Field of Classification Search
    CPC ........ G06Q 30/02; G06F 16/29; G06F 16/958
    See application file for complete search history.

(56) References Cited

U.S. PATENT DOCUMENTS

| | | | |
|---|---|---|---|
| 5,664,133 | A | 9/1997 | Malamud et al. |
| 5,737,527 | A | 4/1998 | Shiels et al. |
| 5,802,361 | A | 9/1998 | Wang et al. |
| 6,154,172 | A * | 11/2000 | Piccionelli ............ H04L 63/107 707/E17.11 |
| 7,136,853 | B1 | 11/2006 | Kohda et al. |

(Continued)

FOREIGN PATENT DOCUMENTS

WO                 94616 A1    8/2008

OTHER PUBLICATIONS

NPL Search Terms (Year: 2023).*

(Continued)

*Primary Examiner* — Syed A Zaidi
(74) *Attorney, Agent, or Firm* — Jones Day

(57) ABSTRACT

Computer-implemented systems and methods are described for providing user access to content via customized options for a plurality of regions, a customized option being provided to a user based on a region associated with the user. An upload of content for distribution and metadata describing the content are received. A first option definition is received that defines first criteria for accessing the content in a first region. A second option definition defining second criteria for accessing the content in a second region is received. One or more options for the content are provided to the user based on the region associated with the user. An identification of an option is received from the user, and access to the content is provided according to the criteria of the option that the user has identified.

18 Claims, 21 Drawing Sheets

(56) References Cited

U.S. PATENT DOCUMENTS

| | | | |
|---|---|---|---|
| 7,464,058 B2 | 12/2008 | Yen et al. | |
| 7,562,153 B2* | 7/2009 | Biliris | H04L 67/1023 709/224 |
| 7,693,959 B2* | 4/2010 | Leighton | H04L 61/5007 709/219 |
| 7,747,720 B2* | 6/2010 | Toebes | H04L 67/1021 709/224 |
| 7,756,913 B1* | 7/2010 | Day | H04L 67/306 709/225 |
| 7,806,329 B2 | 10/2010 | Dmitriev et al. | |
| 8,387,081 B2* | 2/2013 | Beyabani | H04N 21/25435 705/14.1 |
| 8,712,825 B1 | 4/2014 | Holcombe et al. | |
| 2002/0023010 A1* | 2/2002 | Rittmaster | H04N 21/472 348/E7.063 |
| 2002/0087408 A1 | 7/2002 | Burnett | |
| 2002/0120501 A1 | 8/2002 | Bell et al. | |
| 2002/0184314 A1 | 12/2002 | Riise | |
| 2003/0191816 A1* | 10/2003 | Landress | G06Q 30/02 709/219 |
| 2005/0131762 A1 | 6/2005 | Bharat et al. | |
| 2005/0288954 A1* | 12/2005 | McCarthy | G06Q 30/02 705/2 |
| 2006/0020596 A1 | 1/2006 | Liu et al. | |
| 2006/0173701 A1* | 8/2006 | Gurvey | G06Q 20/367 705/902 |
| 2006/0203106 A1* | 9/2006 | Lawrence | H04N 1/00175 386/E5.002 |
| 2006/0235723 A1 | 10/2006 | Millard | |
| 2006/0253580 A1 | 11/2006 | Dixon et al. | |
| 2006/0278064 A1 | 12/2006 | Lourdeaux | |
| 2007/0061242 A1* | 3/2007 | Ramer | G06Q 30/0255 705/37 |
| 2007/0073596 A1 | 3/2007 | Alexander et al. | |
| 2007/0106551 A1 | 5/2007 | McGucken | |
| 2007/0130010 A1* | 6/2007 | Pokonosky | G06Q 30/02 705/14.69 |
| 2007/0156594 A1 | 7/2007 | McGucken | |
| 2007/0169165 A1 | 7/2007 | Crull et al. | |
| 2007/0204308 A1 | 8/2007 | Nicholas et al. | |
| 2007/0208718 A1* | 9/2007 | Javid | H04N 21/252 348/E7.071 |
| 2007/0214149 A1 | 9/2007 | Hoang | |
| 2007/0255965 A1 | 11/2007 | McGucken | |
| 2007/0288308 A1 | 12/2007 | Chen et al. | |
| 2008/0034329 A1 | 2/2008 | Posner et al. | |
| 2008/0040475 A1 | 2/2008 | Bosworth et al. | |
| 2008/0066099 A1 | 3/2008 | Brodersen et al. | |
| 2008/0071688 A1 | 3/2008 | Corbett et al. | |
| 2008/0090513 A1 | 4/2008 | Collins et al. | |
| 2008/0109362 A1* | 5/2008 | Fransdonk | H04L 63/0823 705/51 |
| 2008/0114750 A1 | 5/2008 | Saxena et al. | |
| 2008/0133569 A1 | 6/2008 | Vu et al. | |
| 2008/0201225 A1 | 8/2008 | Maharajh et al. | |
| 2008/0215428 A1* | 9/2008 | Ramer | G06Q 30/02 705/14.66 |
| 2008/0235216 A1 | 9/2008 | Ruttenberg | |
| 2009/0037355 A1 | 2/2009 | Brave et al. | |
| 2009/0197681 A1 | 8/2009 | Krishnamoorthy et al. | |
| 2009/0199227 A1 | 8/2009 | Kennedy | |
| 2009/0217036 A1 | 8/2009 | Irwin et al. | |
| 2009/0240586 A1 | 9/2009 | Ramer et al. | |
| 2010/0058485 A1 | 3/2010 | Gonzalez | |
| 2010/0086283 A1 | 4/2010 | Ramachandran et al. | |
| 2010/0094728 A1* | 4/2010 | Denning | G06Q 30/0601 715/716 |
| 2010/0094878 A1 | 4/2010 | Soroca et al. | |
| 2010/0131895 A1* | 5/2010 | Wohlert | H04L 65/764 709/219 |
| 2010/0205628 A1 | 8/2010 | Davis et al. | |
| 2010/0263005 A1 | 10/2010 | White | |
| 2011/0029393 A1 | 2/2011 | Apprendi et al. | |
| 2011/0126246 A1* | 5/2011 | Thomas | H04L 67/06 725/93 |
| 2011/0145719 A1 | 6/2011 | Chen et al. | |
| 2011/0219394 A1 | 9/2011 | Lueth et al. | |
| 2011/0246574 A1 | 10/2011 | Lento et al. | |
| 2011/0265113 A1 | 10/2011 | Apfel et al. | |
| 2011/0289084 A1 | 11/2011 | Fisher | |
| 2012/0089996 A1 | 4/2012 | Ramer et al. | |
| 2012/0131171 A1 | 5/2012 | Samuel et al. | |
| 2012/0136812 A1 | 5/2012 | Brdiczka | |
| 2016/0191674 A1 | 6/2016 | Estevez et al. | |

OTHER PUBLICATIONS

NPL Search Terms (Year: 2024).*
NPL Search Terms (Year: 2025).*
Mystrands, Inc.; Mystrands Discovery for Windows; www.mystrands.com; 2006.
Pereira, Fernando, Vetro, Anthony, Sikora, Thomas; Multimedia Retrieval and Delivery; Essential Metadata Challenges and Standards; Proceedings of the IEEE, 96(4); pp. 721-744; 2008.
International Search Report; PCT/US2011/022865; Apr. 2011.
Written Opinion of the International Searching Authority; PCT/US2011/022865; Apr. 2011.
Written Opinion of the International Searching Authority; PCT/US2011/022871; 2012.
Subramanya, S.R., Yi, Byung; Utility Model for On-Demand Digital Content; Computer, IEEE Service Center, vol. 38, 6(1); pp. 95-98; 2005.
International Search Report; PCT/US2011/022902; Apr. 2011.
Written Opinion of the International Searching Authority; PCT/US2011/022902; Apr. 2012.
PR Newswire; Press Release; Mar. 12, 2011.
Spears, Joseph; GMANE Article, Beginner Questions on Clustering & M/R; Jul. 15, 2010.
Spears, Joseph; GMANE Article, Recommending Items for Anonymous Users; Apr. 19, 2010.
International Search Report; PCT/US2012/047520; Dec. 2012.
Written Opinion of the International Searching Authority; PCT/US2012/047520; Dec. 2012.
International Search Report; PCT/US2011/022877; Oct. 2011.
Written Opinion of the International Searching Authority; PCT/US2011/022877; Oct. 2011.
DVB: Content Protection & Copy Management, 2005, Retrieved from the Internet <URL: web.archive.org/web/20070303124913/http://www.dvb.org/technology/dvb-cpcm/a094.DVB-CPCM.pdf>, pp. 1-103 as printed.
Muhlbauer, Adam, Safavi-Naini, Reihaneh, Salim, Farzad, Sheppard, Nicholas, Surminen, Martin; Location Constraints in Digital Rights Management; Computer Communications, Elsevier Science Publishers, 31(6); pp. 1173-1180; 2008.
Written Opinion of the International Searching Authority; PCT/US2011/022876; 2012.
Amazon VOD, 2009, Retrieved from the Internet <URL: web.archive.org/web/20091207064514/http://www.amazon.com/gp/video/ontv/faq>, pp. 1-3 as printed.
Dias et al., 2011, Retrieved from the Internet <URL: webapps.stackexchange.com/questions/13643/how-to-circumvent-countryrestrictions-without-installing-software>, pp. 1-3 as printed.
Amazon.co.uk, 2009, Retrieved from the Internet <URL: web.archive.org/web/20091001010252/http://www.amazon.co.ukl>, pp. 1-3 as printed.
Finding Nemo, Amazon, 2013, Retrieved from the Internet <URL: amazon.com/Finding-Nemo-Two-Disc-Collectors-Edition/dp/B00005JM02/ref=sr_1_1?ie=UTF8&qid=1361810135&sr=8-1&keywords=finding+nemo+DVD>, pp. 1-5 as printed.
Finding Nemo, Amazon, 2013, Retrieved from the Internet <URL: amazon.co.uk/Finding-Nemo-Disc-Collectors-Edition/dp/B00007KGCW>, pp. 1-5 as printed.
(No stated author) Whirlpool; Why can't I use Amazon Video on Demand?; Apr. 2009; Retrieved from the Internet <URL: forums.whirlpool.net.au/archive/1179629>; pp. 1-3 as printed.

(56) References Cited

OTHER PUBLICATIONS

Chellappa et al.; Economic Implications of Variable Technology Standards for Movie Piracy in a Global Context; 2003; Retrieved from the Internet <URL: pdf.aminer.org/000/244/007/economics_of_technology_standards_implications_for_offline_movie_piracy_in.pdf>; pp. 1-32 as printed.

Etherington; HD Movies Now For Sale in iTunes; Mar. 2009; Retrieved from the Internet <URL: gigaom.com/2009/03/20/hd-moviesnow-for-sale-in-itunes/>; pp. 1-5 as printed.

(No stated author); Linking to the iTunes Music Store; Dec. 2009; Retrieved from the Internet <URL: images.apple.com/itunesaffiliates/US/2009/Document/LinktoiTune.pdf>; pp. 1-7 as printed.

Hollington; The Complete Guide to iTunes Movie Rentals; Feb. 2008; Retrieved from the Internet <URL: ilounge.com/index.php/articles/comments/the-complete-guide-to-itunes-movie-rentals-part-1 l>; pp. 1-20 as printed.

No stated author; Video Download Checklist—CreateSpace; 2008; retrieved from the Internet <URL: web.archive.org/web/20080812071257/http://www.createspace.com/Products/VideoDownloadChecklist.jsp;isessionid=02B4505A5CC9CA0759C878AC7E8C84B6.cspworker00>; pp. 1-1 as printed.

No stated author; Video Download overview—CreateSpace; 2008; retrieved from the Internet <URL: web.archive.org/web/20080901053438/http://www.createspace.com/Products/VideoDownload.jsp;jsessionid=0B8CF30FF1ACDFFE3CDB7622979AC004.cspworker00>; pp. 1-2 as printed.

NPL Search Terms (Year: 2021).

* cited by examiner

SYSTEMS AND METHODS FOR DYNAMIC MANAGEMENT OF GEO-FENCED AND GEO-TARGETED MEDIA CONTENT AND CONTENT ALTERNATIVES IN CONTENT MANAGEMENT SYSTEMS

CROSS REFERENCE TO RELATED APPLICATIONS

This application claims priority to U.S. patent application Ser. No. 12/697,004, filed Jan. 29, 2010, which is incorporated herein by reference in its entirety.

TECHNICAL FIELD

The present disclosure relates generally to computer-implemented systems and methods for dynamic management of content and content-related data and metadata.

BACKGROUND

Content creators (e.g., filmmakers, television producers, recording artists, online game developers, etc.) are significantly limited in their ability to develop and execute content-related strategies such as processing, marketing, promotion, management, packaging, merchandising, fulfillment, delivery, distribution, licensing, and enforcement of their own content and content-related data. Effective mastering and implementation of such efforts is typically beyond the capabilities of content creators because such efforts typically require marketing and/or distribution resources that are unavailable to the content creators. Because of this limitation, content creators often seek to enter into content-related agreements in which the content creators relinquish control with respect to some or all rights in the content (e.g., a licensing agreement with a film distributor granting various territory and/or media rights).

One drawback with traditional content-related agreements (e.g., in the entertainment industry) is that they are rarely available to a content creator (e.g., an independent filmmaker, television producer, or game developer). In other words, often only the most well-known content creators are able to secure a content-related agreement (e.g., a distribution agreement, assignment, or license) with a third party content provider (e.g., a distributor, subdistributor, network, broadcaster, syndicator, publisher, assignee, or licensee). Moreover, even when a content creator is able to secure a content-related agreement, the terms are often very one-sided favoring the content provider. Thus, these content-related agreements are often unfairly restrictive to the content creator, limiting additional marketing or distribution of content for a set amount of time (e.g., until costs advanced or expended pursuant to the agreement are recouped).

Additionally, often such agreements (i) do not contain any provisions that impose a duty on the content provider to actively market or promote the content creator's content, and/or (ii) the content creator does not have sufficient leverage over the content provider to enforce a provision requiring active marketing or promotion of the content. As a result, these agreements can be highly disadvantageous to a content creator for many reasons. For example, over the term of such an agreement, the value of the content is often diminished while the content creator awaits the expiration of the agreement. Moreover, any failure of the content provider to actively market or promote the content can postpone or preclude any potential revenue that may be derived from the content. This can prolong the time it takes for the content creator to recoup the costs associated with creating the content, and in some instances, preclude such recoupment altogether. This can create a cash flow burden on the content creator. Additionally, the terms of such agreements rarely require the content distributor, subdistributor, assignee, or licensee to keep the content creator informed of the success or progress of any content-related strategies.

Thus, what is needed in the art are systems and methods for empowering content creators to market and distribute their own content without entering into onerous one-sided agreements with content providers, such as distributors, subdistributors, assignees, or licensees.

SUMMARY

The present disclosure addresses the need in the art. Systems and methods are provided for empowering content creators (e.g., initial copyright owners; "authors," as defined under U.S. copyright law; and those acquiring ownership of media content, such as assignees) to market and distribute their own content without entering into onerous one-sided agreements with content distributors. Additionally, systems and methods are provided for empowering content providers (e.g., third party distributors, subdistributors, broadcasters, networks, syndicators, assignees, and licensees) to market and distribute (including, without limitation, subdistribution, broadcasting, syndication, assignment, and licensing of) content when the content provider is unable to exploit the content through other distribution channels.

In accordance with the teachings provided herein, systems and methods for content and content-related data and metadata processing, marketing, promotion, management, packaging, merchandising, fulfillment, delivery, distribution, licensing, and enforcement are provided. For example, a system and method can be configured to provide user access to content via customized options for a plurality of regions, where a customized option is provided to a user based on a region associated with the user. An upload of content for distribution and metadata describing the content may be received. A first option definition defining first criteria for accessing the content in a first region may be received, where the criteria include an option type, a value, and a first region where the first option is valid. A second option definition defining second criteria for accessing the content in a second region may also be received, where the second criteria include an option type, a value, and a second region where the second option definition is valid. One or more options for the content are provided to a user based on the region associated with the user. An identification of an option is received from the user, and access to the content is provided according to criteria of the option that the user has identified.

A system and method may further be characterized by the content and the metadata associated with the content being identical across a plurality of options associated with the content. The user may be provided the first option but not the second option based on the region associated with the user. The region associated with the user may be associated with the user based on: a user input, an address, or a detected Internet access provider. A second user associated with a third region may not be provided with any options for the content based on the second user being associated with the third region. A second user associated with a third region may not be provided with any options for the content based on a lack of any options being associated with the third region.

The first option may include a time period of validity, where the time period of validity is preceded by a period where materials for the content are available in the first region. A user associated with the second region may not be able to access the materials prior to a beginning of the time period of validity of the first option. The first option may include one of: a higher value than the second option, a higher video resolution than a video resolution included in the second option, a different option type than is included in the second option, and additional content not included in the second option. The option types may include a time-period limited option, a downloadable for a fixed time period option, and a permanent option. The time-period limited option may enable access to the content via streaming of the content, where the downloadable for a fixed time period option and the permanent option may enable access to the content via downloading of the content such that the content can be accessed offline.

A plurality of options may be defined for the content for the first region. A user may not be able to locate content if no options or materials are available for the region associated with the user. The second option may further include an upgrade of a previously agreed upon option or a link option to second content in addition to the content.

Particular embodiments of the subject matter described in this specification can be implemented to realize one or more of the following advantages. A content management system may enforce existing geography based contract terms in order to remain in compliance with existing agreements insofar as restrictions on sale and promotion in particular territories are concerned. A content management system may further dynamically modify geographic restrictions in order to allow the content provider to either enter in to or exit from specific geography based restrictions while allowing the terms of those agreements to be enforced insofar as restrictions on sale and promotion in particular territories are concerned. In addition, a content management system may create license offerings that allow the content provider to optimize revenues in individual regions by taking advantage of the willingness of consumers in these regions to purchase at a price within their own regional price tolerances. Further, a content management system may create license offerings that address the particular packaging sensitivities of individual geographic territories in order to provide value-added license options that justify maximum revenues within the price tolerances of individual regions.

A content management system may dynamically modify the terms of license offerings on a territory by territory basis in order to account for variations in the market demand in a particular geographic region in order to maximize the amount of time that the content can remain relevant to consumers and may further create a segmented pricing structure that allows users from disparate territories to coexist on the same platform where pricing for groups of users may be structured differently. Additionally, a content management system may create special promotional license offers, upgrades, cross-sells and bundles that allow the content creator to take advantage of the relationship that some consumers in a specific geographic region will have with the particular content or a subgroup of the content available to the content provider or a third party promoter or participant.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIGS. 11-17 detail exemplary interfaces for enabling a content provider to supply content and geography based content access license offers to a content management system.

FIGS. 18 and 19 depict exemplary interfaces for providing geography based content access license offers to users to facilitate the acquiring of content by a user.

DETAILED DESCRIPTION

Figure 1:
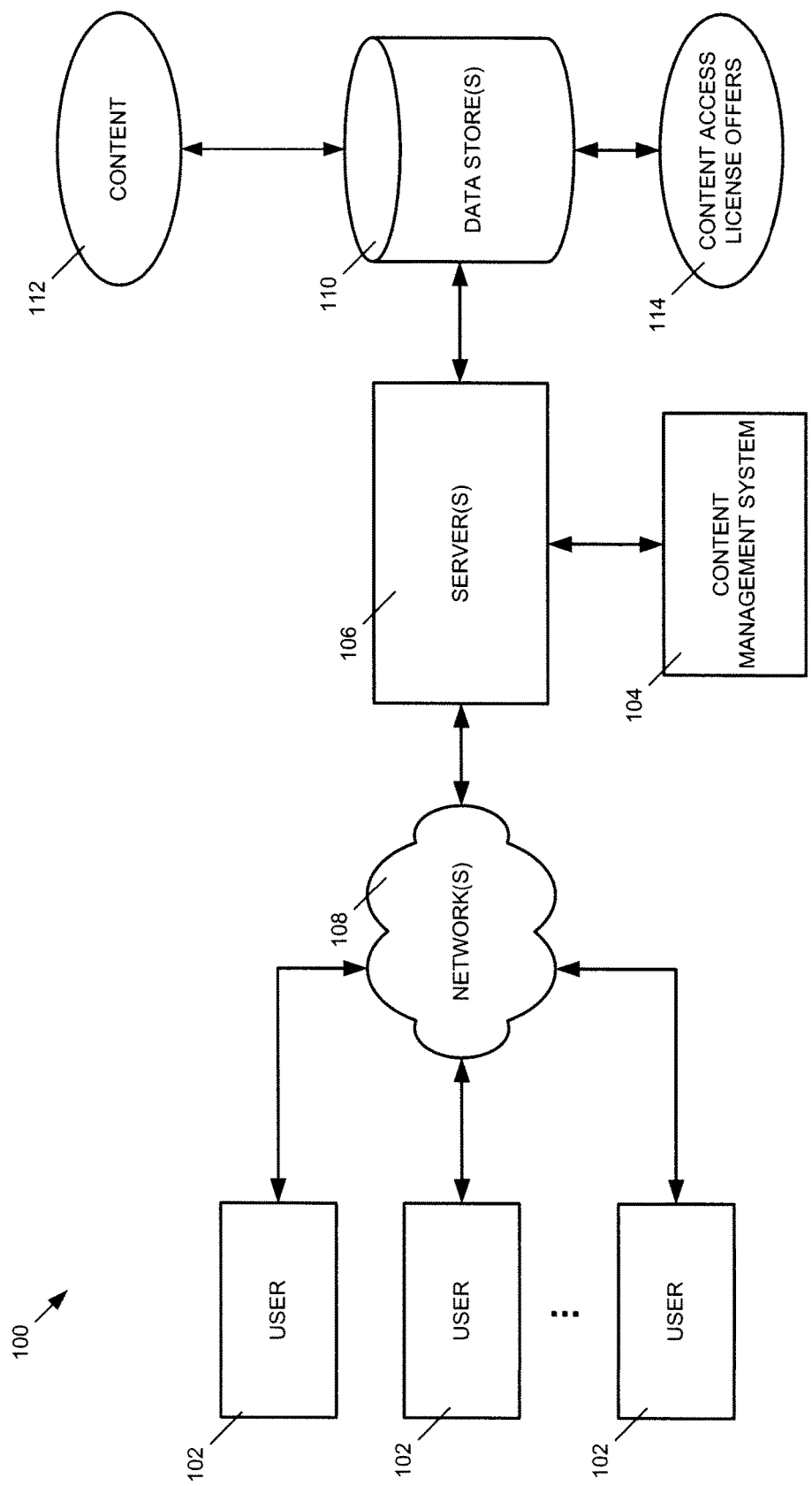
FIG. 1 depicts an exemplary computer-implemented environment where users can interact with a system for content processing, marketing, promotion, management, packaging, fulfillment, delivery, and enforcement via a content management system.

FIG. 1 depicts a computer-implemented environment where users 102 can interact with a system for content and content-related data and metadata processing, marketing, promotion, management, packaging, merchandising, fulfillment, delivery, distribution, licensing, and enforcement using a content management system 104.

The content management system 104 provides a framework for a content provider or creator to supply and manage the online and offline distribution of content and for users to locate and access that content. The content management system may be utilized in a variety of scenarios. For example, a content provider may upload his content to the content management system 104 and desire to make different content offerings available to different geographical regions. For example, the content provider may wish to offer a first offer package in the United States that includes a high-definition video version of the content along with bonus content in the form of actor interviews and behind the scenes footage for $30.00. Additionally, the content provider may wish to offer a second offer package in East Timor that includes a regular-definition video version of the content with no bonus content for $10.00.

The content provider may wish to provide these differing offers to different geographic reasons for a variety of reasons. For example, the content provider may have access to marketing data that suggests that demand for the content being offered is inelastic, such that users are very sensitive to price in deciding whether or not to purchase content. In this example, East Timorese users may be so concerned with price, that they may be willing to forego higher-definition viewing and bonus features in exchange for a lower price offering. In the United States, it may be determined that users will choose a lower priced content offer if available, but will usually purchase a higher priced offer, if the higher priced offer is the only offer available. Thus, higher revenues may be realized in the United States by providing only the higher priced offer, while revenues may be strong in East Timor based on the lower priced offer being provided to East Timorese users.

A content provider may wish to provide different offerings to different geographical regions for other reasons as well. For example, a content provider may be concerned about content piracy in certain geographical regions. For instance, a content provider may wish to provide an offer to download full high-definition video content in the United States and Canada, while only a low resolution offer or no download offers at all are provided to countries where content piracy is rampant. As another example, a content provider may agree to a distribution license in which the distributor agrees to buy the exclusive rights to market and sell the content in a specific geographic region. The content provider may then desire to structure additional content offers and promotions for other geographic areas over which the distribution agreement does not cover in order to maximize revenues while operating within the terms of the distribution agreement.

A content management system 104 may increase capability and flexibility of content providers to make their content available for favorable terms while offering users interested in that content an easy mechanism for accessing, purchasing, and viewing desired content. The content management system 104 contains software operations or routines for providing user access to content via customized content access license offers for a plurality of geographical regions where a customized content access license offer is provided to a user based on a geographical region (e.g., cities, states, towns, regions, countries, sets of countries, etc.) and/or Internet domains (e.g., predetermined sets of IP addresses, top level domains, country code top level domains, web sites, ISPs, etc.) associated with the user. The content providers and users 102 can interact with the content management system 104 through a number of ways, such as over one or more networks 108. One or more servers 106 accessible through the network(s) 108 can host the content management system 104. The content management system 104 provides user access to content via customized content access license offers for a plurality of geographical regions. The one or more servers 106 are responsive to one or more data stores 110 for providing data to the content management system 104. Among the data contained in the one or more data stores 110 may be content data 112 supplied by a content provider for user access as well as content access license offers 114 that facilitate the provisioning of content to the users 102.

Figure 2:
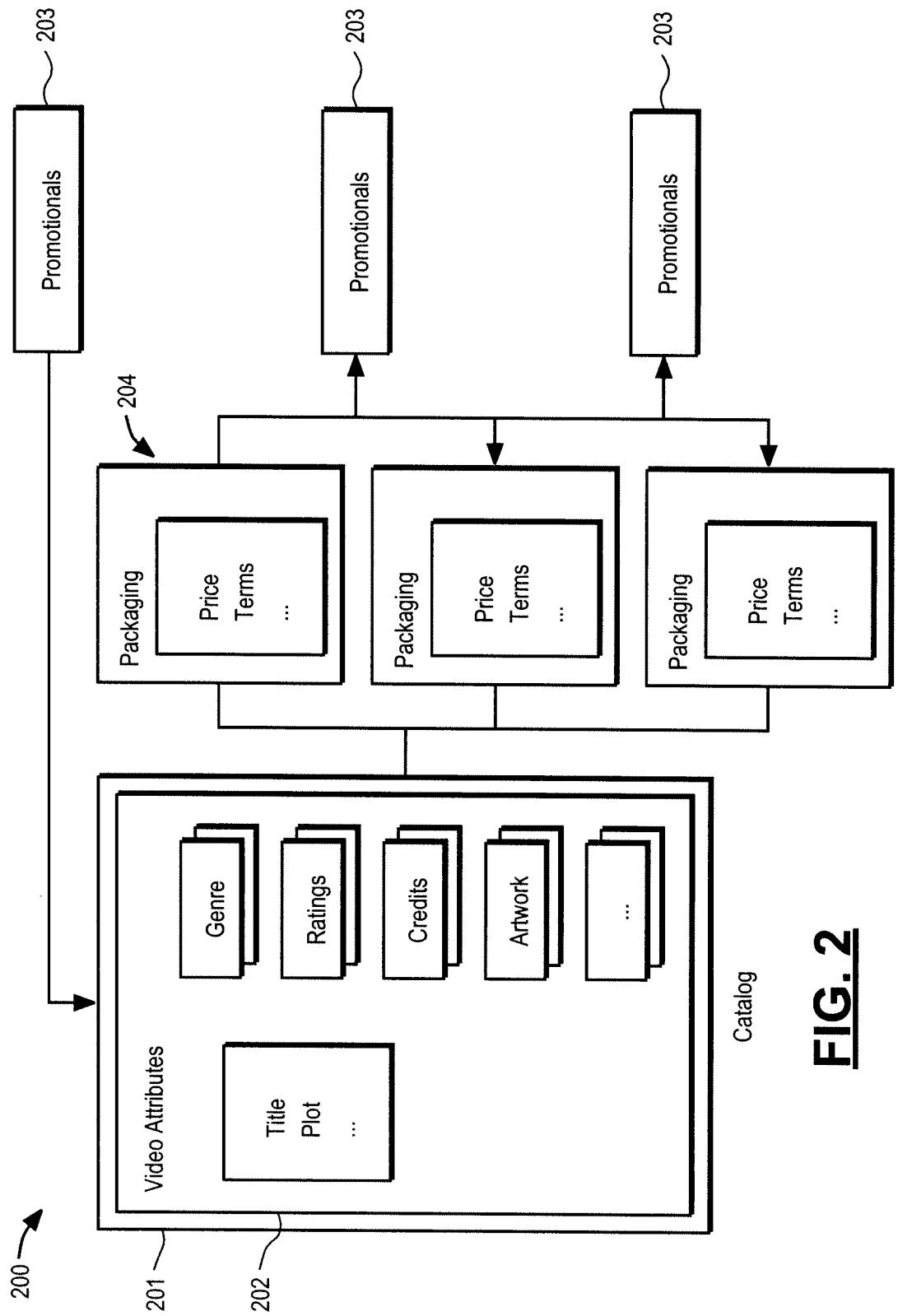
FIG. 2 shows an exemplary display of certain components within a content management system.

FIG. 2 shows an exemplary display 200 of certain components within a content management system. In some implementations, the system can include a catalog 201. The catalog can include static elements corresponding to aspects of the content that tend to remain constant in the system. For example, a catalog can include static elements corresponding to aspects of multimedia content, such as video or film content 202. In this example, video content 202 can include certain video attributes, such as title, plot, genre, ratings, credits, artwork, as well as other types of media. In other examples, a catalog can include static elements corresponding to other types of multimedia content such as game content, audio content, e-books, software, electronic photos, and electronic artwork. Content can be added or deleted from the catalog; thus, the catalog can be dynamic.

In some implementations, the system can include one or more promotional functionalities 203. For example, a promotional functionality 203 can include a limited ability to promote content without the ability to sell the content. In this example, a content creator can promote content prior to the content being available to a user for purchase. In another example, a third party (meaning someone other than a content provider or recipients of content from the content provider) can create promotions as an influencer for a larger audience. Additionally, a third party can receive a commission for promoting content without having a license to sell the content.

In some implementations, a promotional functionality 203 can include an ability to up-sell content or properties of such content (e.g., the grant of a license to the content, the expansion of the terms of the license to the content, an expansion of the quality, resolution, or other property of the content, etc.). In an example of such implementations, when a user exhibits an interest in paying a first amount for a limited use license to use content for a predefined time period, the content creator can dynamically create and offer the user another license option to use the same content at a second price for a greater period of time. For example, when a user rents content, such as a video, for $5.00, the content creator is notified or otherwise made aware via a report. Once aware, the content creator can dynamically create and offer a content purchase option, such as a reduced purchase price from $15.00 to $11.00 for the user who has rented the content for $5.00, to that user. Such an up-sell offer may also be generated automatically without content provider notice of the original rental.

In some implementations, the promotional functionality 203 can include an ability to cross-sell content. The cross-sell option can allow the content creator the ability to familiarize the user with more content that the user may not otherwise be aware. For example, when a user exhibits an interest in learning about content, the content creator can dynamically create a reference to related content. In this example, when a user selects a page on which content is hosted, the content creator is notified or otherwise made aware via a report. Once aware, the content creator can create a reference to related content (e.g., if you like A, you may be interested in B). In another example, when a user exhibits an interest in licensing content, the user may be presented with an additional license option for similar content. In this example, when a user selects a content rental or purchase option corresponding to first content, the user may be offered a content purchase option for similar second content (e.g., if you like A, you can buy B for $3.00).

In yet another example, when a user exhibits an interest in licensing content, the content creator can dynamically create and offer the user an additional license for similar content. In this example, when a user selects a web page or panel on which content is hosted, the content creator is notified or otherwise made aware. Once aware, the content creator can dynamically create and offer a content purchase option for the content on the current web page or panel as well as one or more additional purchase options for the similar content (e.g., if you like A, you can buy A and B together for $10.00).

In some implementations, using the catalog 201, one or more licensing options (licensing packages 204), can be dynamically generated by a content creator using the system. In other implementations, using the catalog 201 and the promotional functionality 203, one or more licensing packages 204, can be dynamically generated by a content creator using the system. Licensing packages 204 can include the price and terms of a licensing agreement between a content creator and a user as well as a geographical region (cities, states, towns, regions, countries, sets of countries, etc.) and/or Internet domain(s) (e.g., predetermined sets of IP addresses, top level domains, country code top level domains, web sites, ISPs, etc.) in which the licensing package 204 is valid. A user can be concurrently presented with one or more licensing packages 204. In exemplary instances in which the content is a film, licensing packages 204 may include a "high definition" ("HD") option, an option that defines the terms of a rental agreement, an option that defines the terms of a purchase agreement, an option indicating whether the content is downloadable, an option indicating whether the user has access to bonus content, as well as other options.

Additionally, in some implementations, one or more additional licensing packages 204 can be dynamically generated and presented to the user based upon user interaction with the system. For example, as noted above, a content creator can dynamically offer the user an up-sell or a cross-sell based upon a user selection. In some implementations, when a user executes a first license package 204, such as renting content, and then accepts an offer to execute a second license package 204, such as purchase the rented content, the first license can expire upon the execution (acceptance) of the second offer. In other implementations, when a user executes a first licensing package 204, such as purchasing of a standard definition version of a film, and accepts an offer to execute a second license package 204, renting a high definition version of the film, the first license can run concurrently with the second offer. In still other implementations, when a user executes a first licensing package 204, such as purchasing of a standard definition version of a film, and accepts an offer to execute a second license package 204, renting a high definition version of the film, the first license can be suspended for the duration of the second offer. The first license may then be selectively or automatically reinstated upon completion of the second offer.

Additionally, in some implementations, licensing packages 204 can be activated and deactivated. For example, a licensing package 204 can be activated or deactivated manually by the content creator or other person with sufficient authority, automatically by the system, or in accordance with one or more predefined settings, such as those supplied by a content provider.

Figure 3:
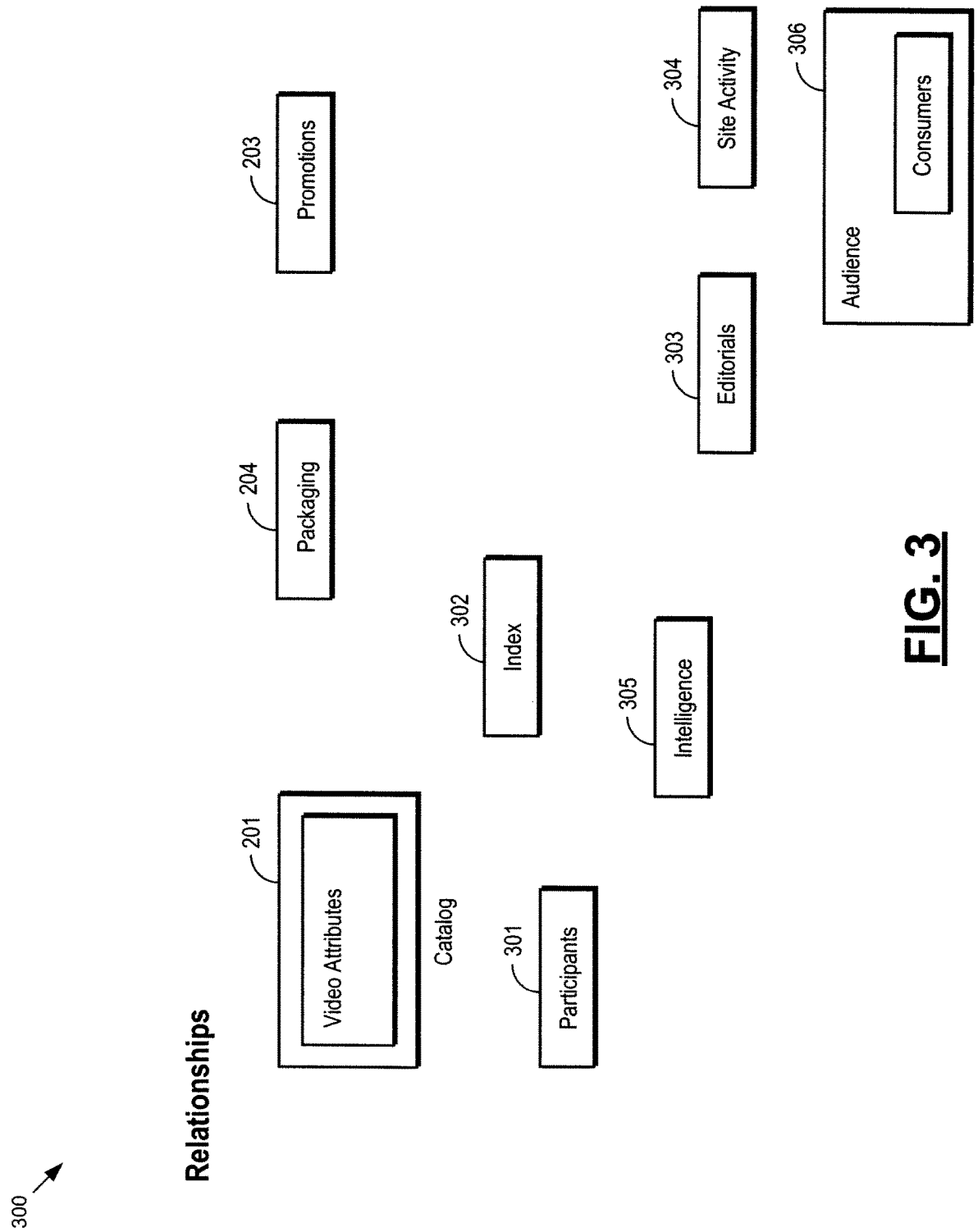
FIG. 3 shows an exemplary display of additional components within a content management system.

FIG. 3 shows an exemplary display 300 of additional relationships within the system. In addition to relationships between the catalog 201, the promotional functionality 203, and the licensing packages 204, in some implementations, the system can include additional relationships. Additional relationships can exist among content creators (participants 301), and the users of content (audience 306). Relationships can be developed based upon interactions with one or more system components. For example, as noted above, using the catalog 201 and the promotional functionality 203, a participant 301 can offer one or more licensing packages 204 to an audience member 306. In this example, participants 301 can include a content provider, such as anyone offering a license for content, such as a filmmaker or a distributor, or anyone participating in the creation of the content, such as actors, writers, or directors.

In some implementations, the system can include a searchable index 302 which can facilitate site navigation and organization of raw, unprocessed and derived, processed data corresponding to user interaction with the system. In some implementations, the index 302 can include a hierarchical arrangement of un-weighted attributes corresponding to content in the system. In other implementations, the index 302 can include a hierarchical arrangement of weighted attributes corresponding to content in the system. Additionally, attributes can be weighted differently according to a plurality of factors or words. For example, a content provider can determine that a particular word is of greater importance when searching the index.

The audience 306 can interact with the index 302 to search and locate data. In some implementations, based upon audience 306 interaction with the index 302 and data from the catalog 201 and one or more licensing packages 204 can be presented to the audience 306. In some implementations, site activity 304, including audience 306 interaction with a website, can be indexed 302 and stored for later analysis. In these implementations, audience interaction can include all activity up to and including a purchase. Thus, even if a purchase is not made, data related to audience interaction with content on the website can be indexed and used for later analysis of near misses. In some implementations, audience interaction can also include activity following a purchase. Thus, post purchase data related to audience interaction with content on the website can also be indexed and used for later analysis.

In some implementations, the audience 306 can provide feedback to the system using an editorial functionality 303. For example, the audience 306 can critique content (e.g., write a review), or rate content. In another example, the audience 306 can participate in a conversation or on-line dialog about the content. In this example, the audience 306 can participate in a chat room dialog with one or more participants 301. In yet another example, an audience member 306 can generate a review that can be posted or displayed, such as on a social network website, where the audience member 306 and one or more other users can participate in a dialog about the content.

In some implementations, site activity 304 and editorial information 303 are combined to generate intelligence 305 that can be used to generate new promotional functionalities 203 and new licensing packages 204. In some implementations, new promotional functionalities 203 and new licensing packages 204 can be based on intelligence 305 and generated manually, such as by a participant 301. In some implementations, new promotional functionalities 203 can be generated automatically by the system based upon prior participant 301 or audience 306 interactions with the system or based on one or more predefined settings.

In some implementations, intelligence 305 can include raw, unprocessed and/or derived, processed data. Intelligence 305 can be dynamic. For example, the return of content by a dissatisfied audience member can automatically change the intelligence 305. In some implementations, intelligence 305 can be processed and statistics can be automatically generated in real time based upon website activity. Generated statistics can be used by the system to generate one or more reports based upon audience 306 interaction. For example, reports can be used to examine account histories and make recommendations for a single account or for a group of related accounts. In some implementations, generated statistics can be compared to one or more pre-defined benchmarks or thresholds to determine whether promotional functionalities 203 and licensing packages 204 need to be adjusted. Adjustments to promotional functionalities 203 and licensing packages 204 can allow a participant 301 to define and refine efficient ways to target new and existing audience members 306 based upon system intelligence 305.

Defining and refining efficient ways to target new and existing audience members 306 based upon system intelligence 305 can be done dynamically. For example, as audience 306 interest changes (e.g., over time), a content creator can use the system to evaluate user interest in real-time. Additionally, a content creator can adjust promotional functionalities 203 and licensing packages 204 in real-time. These adjustments can be stored along with data and logic used to make the adjustments. Stored data and logic corresponding to a content creators adjustments can then be used by the system to dynamically evaluate user interest (e.g., in real-time) and without human intervention (e.g., by the content creator). Dynamic evaluations made by the system can also be adjusted by a content creator at any time.

In some implementations, static catalog data 201 can be a globally constant description (e.g., of defined structured data fields) that includes individual references corresponding to the content of each object (e.g., a video) individually. In these implementations, a globally constant description of static catalog data 201 can allow a content creator to organize data in accordance with user interest and user preference with respect to content interaction. Additionally, other data corresponding to the distribution and management of content (e.g., content price and related terms of restriction), can be defined dynamically (e.g., in accordance with intelligence 305). This decoupling facilitates data aggregation, cross-content recommendations, and the dynamic (e.g., "on-the-fly") creation and distribution of licensing packages (e.g., in real-time). For instance, all users can benefit from the ability to interact with universal editorial information 303 while concurrently having individualized licensing packages 204 available (e.g., customized on an individual user basis).

Figure 4:
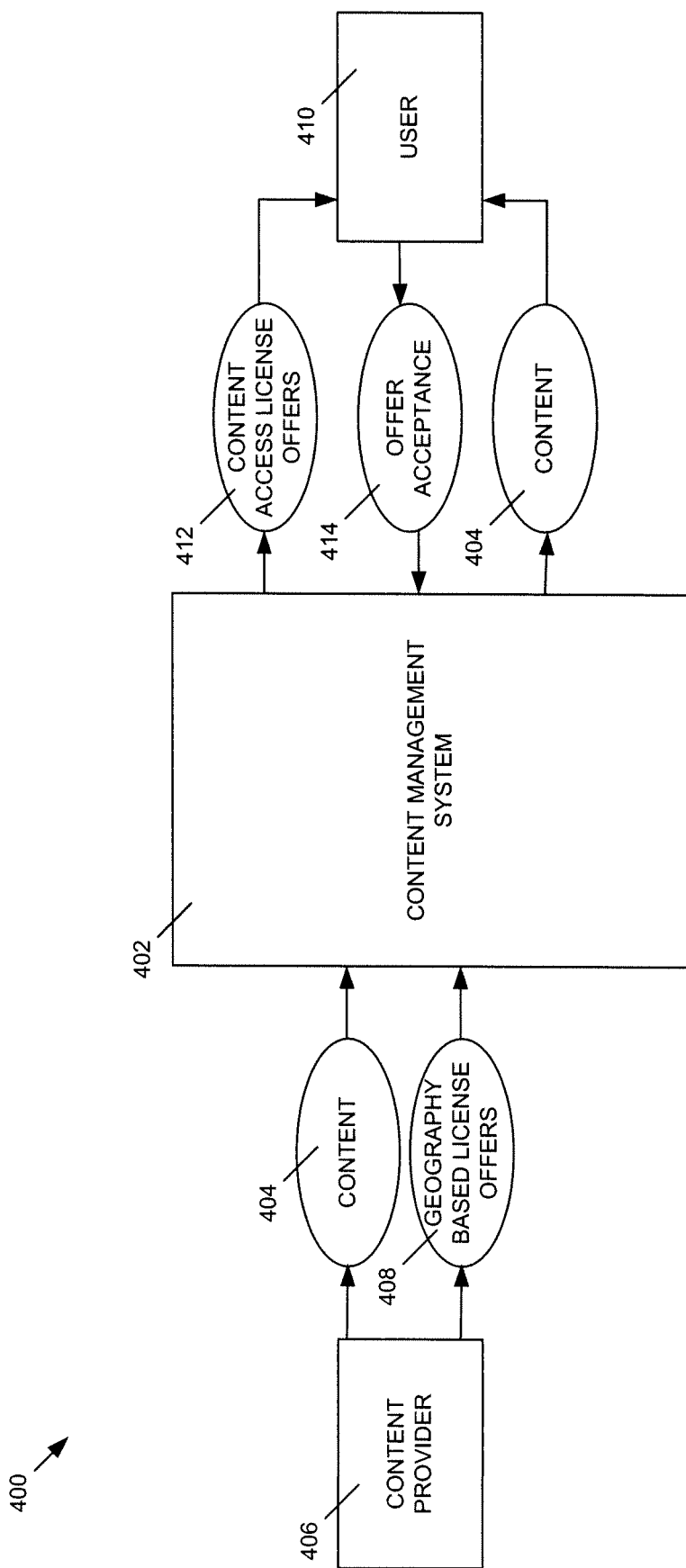
FIG. 4 is an exemplary block diagram depicting a content management system for providing user access to content via customized content access license offers for a plurality of geographic regions.

FIG. 4 is an exemplary block diagram depicting a content management system for providing user access to content via customized content access license offers for a plurality of geographic regions (e.g., cities, states, towns, regions, countries, sets of countries, etc.) and/or Internet domains (e.g., predetermined sets of IP addresses, top level domains, country code top level domains, web sites, ISPs, etc.). The content management system 402 receives content, such as video, game content, audio content, e-books, software, electronic photos, electronic artwork, or other media from a content provider 406. The content provider 406 also provides one or more geography based and/or Internet domain based (hereinafter "geography based") license offers 408. The geography based license offers 408 provide terms to which a user 410 must agree for that user 410 to access the provided content 404. A geography based license offer can include: a license type for the offer to access the content 404, such as pay-per-view, rental, or purchase; a price that must be paid by the user 410 to accept the offer; as well as specification of a geographical region and/or Internet domain for which the geography based license offer 408 is valid. A geography based license offer 408 can include other terms such as a video resolution at which the content is to be made available, and the availability of bonus content (e.g., behind the scenes footage, actor interviews, etc.) with the offer.

A geographic region may be any delineation of geography. For example, a geographic region may be a hemisphere, a continent, a collection of countries, a single country, a state or territory, a county, a city, or any other area or combination of areas. One geographic region may be a subset or superset of another geographic region. For example, a content provider may promote or make a particular content available for rental in a particular set of geographies, while allowing an actual purchase of that content in only a subset of those geographies.

The content 404 and geography based license offers 408 supplied by the content provider 406 are stored at a data store to which content management system 402 is responsive for subsequent user 410 access. A user 410 can access content 404 or promotional materials regarding the content 404 in a variety of ways, such as via search, browsing categories of content, via a direct link to a page describing the content 404, or other mechanism. Upon locating a page describing the content 404, the user may be provided with one or more content access license offers 412. The content access license offers 412 may be tailored to a geographical region associated with the user 410.

For example, only a subset of the geography based license offers 408 supplied by the content provider 406 may be valid in the geographical region associated with the user 410. In such a scenario, only those offers that are valid in the geographical region associated with the user 410 will be provided to the user as content access license offers 412. In some embodiments, if no license offers or promotional materials are identified as being valid for the geographical region associated with a user 410, then the user may be prevented from locating a page describing that content via search or browsing content categories. In other embodiments, certain geographical regions may be explicitly forbidden from finding certain content via search or category browser according to a content provider 406 setting.

For content 404 that a user 410 is authorized to access or view promotional materials, the user may be provided with one or more content access license offers 412 that are valid for the geographical region and/or Internet domain associated with the user, where the content access license offers supply options for the user 410 to access the content 404. For example, a first content access license offer 412 may provide a rental agreement for the content, where the user may access the content via streaming media, for a first price, while a second content access license offer 412 may provide a purchase option, where the user may download the content 404 and view the content offline, for a second price. The user may select one of the content access license offers 412 via an indication of offer acceptance 414. The content management system 402 may then secure payment (e.g., if payment is required by the selected content access license offer 412), such as via credit card, e-check, or other medium. Upon satisfaction of the user's obligations, the content 404 can be provided to the user 410 according to the terms of the accepted content access license offer.

Figure 5:
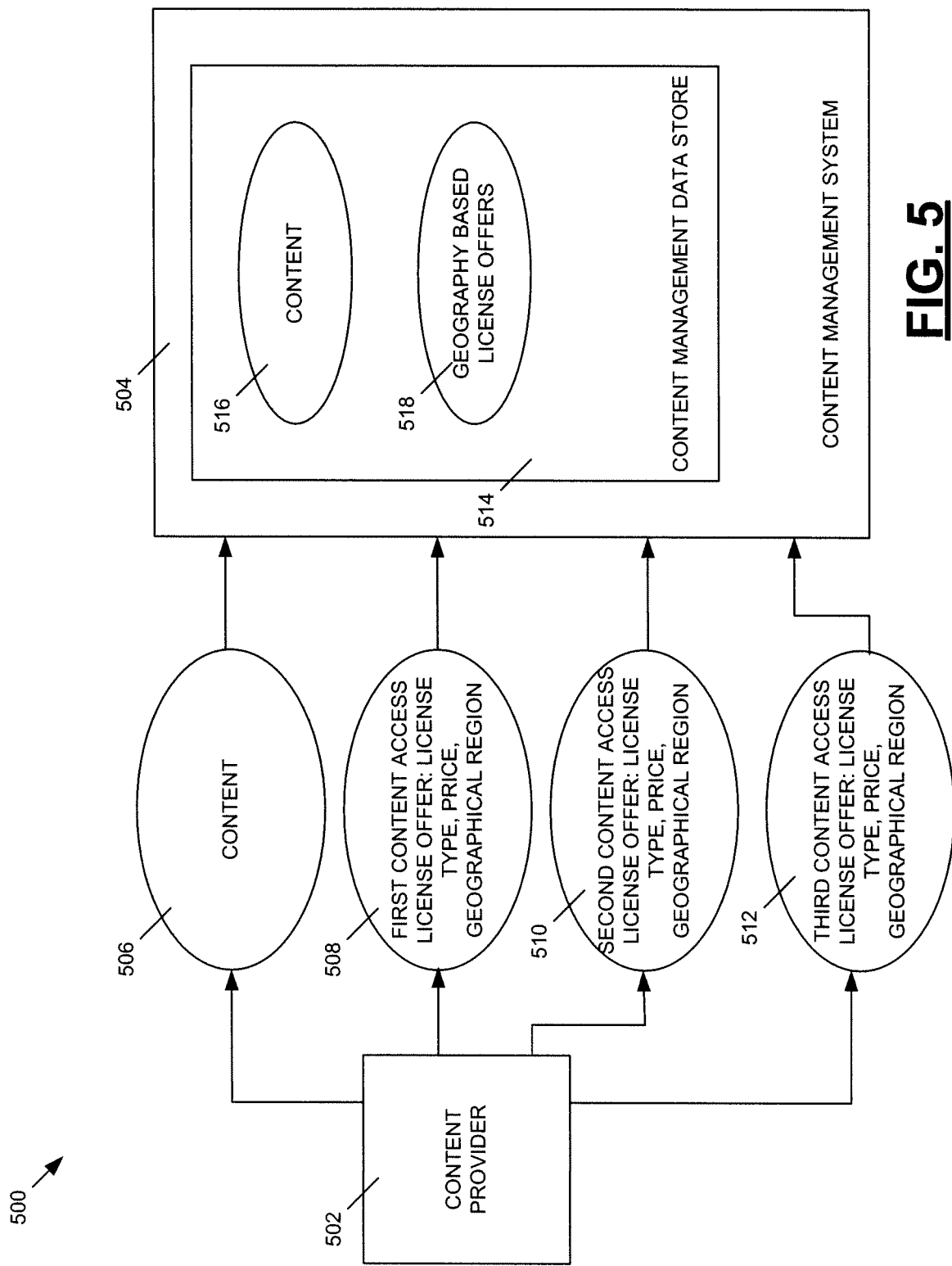
FIG. 5 is an exemplary block diagram identifying example geography based license offer constructs provided by a content provider to a content management system.

FIG. 5 is a block diagram identifying example geography based license offer constructs provided by a content provider 502 to a content management system 504. In addition to supplying content 506 for distribution, the content provider 502 can provide one or more geography based content access license offers 508, 510, 512 to the content management system 504 that may be stored locally or remotely in a data store 514. Each geography based content access license offer 508, 510, 512 details a type of license associated with the offer, a price that a user must pay to accept the offer, and the geographical regions for which the geography based content access license offer 508, 510, 512 is valid. The content 506 and the geography based content access license offers 508, 510, 512 can be supplied by the content provider 502 and can be stored in the content management data store 514. For example, the content management data store 514 can be a relational database containing content records 516 and geography based license offer records 518 that are linked such that geography based license offer records 518 identify the content 516 with which they are associated.

It should be noted that, while three license offers are depicted in FIG. 5, a content provider may define any number of geography based license offers for provided content including zero, one, two, or many offers. Additionally, in some embodiments, content may also be associated with one or more geographic regions, such that geographical regions where content may be located by search or otherwise accessed may be identified. Additionally, geographic regions where content is not permitted to be accessed by search or be otherwise accessible may be identified.

Figure 6:
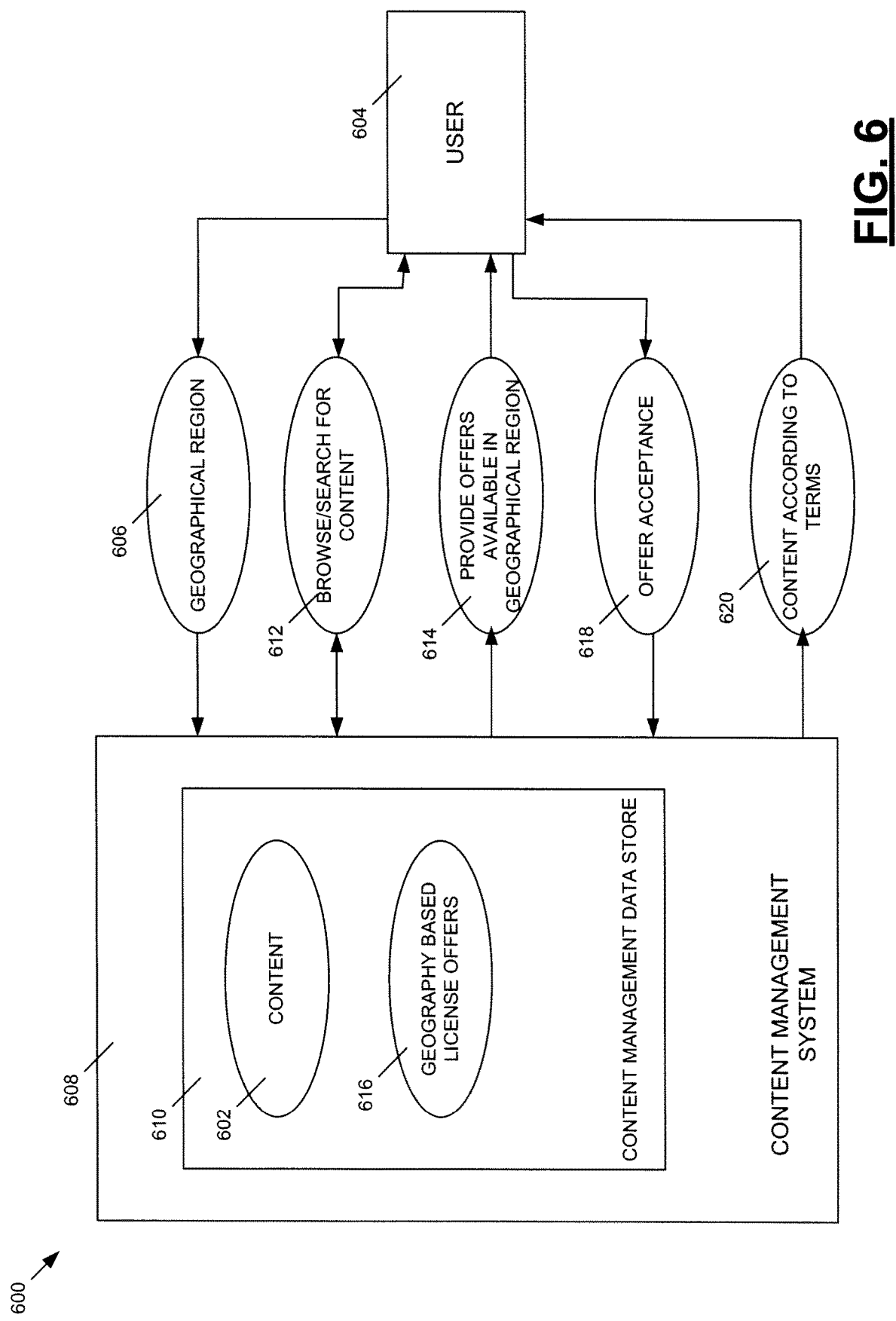
FIG. 6 is an exemplary block diagram depicting the access of content by a user associated with a geographical region from a content management system.

FIG. 6 is a block diagram depicting the access of content 602 by a user 604 associated with a geographical region 606 from a content management system 608. A user 604 may be associated with a geographical region 606 in a variety of ways. For example, when registering for an account with a content management system 608, a user may enter a residence address from which the geographical region 606 associated with the user 604 may be identified. A geographical region 606 associated with a user 604 may also be identified based on a billing address of a credit card used for payment for content 602 by the user 604, the location of an Internet service provider the user 604 utilizes to access the content management system 608, or other manner. The determination of the user's location could also be determined by the combination of these enumerated factors. A user 604 may browse or search for content stored in a content management data store 610 at 612. Upon finding content 602, the user 604 may be provided with one or more offers 614 that are available and valid in the geographical region 606 associated with the user 604 from the pool of all geography based license offers 616 that are associated with the located content 602. The user 604 may choose one of the provided offers 614, indicating that selection using an offer acceptance 618. If the user 604 has fulfilled all of his obligations in accepting the offer, such as providing remuneration for the desired content, then the content is provided to the user at 620 according to the terms of the accepted offer.

The determination of offers provided to a user 604 at 614 may be made in a variety of ways. For example, all offers that specifically identify the geographical region 606 associated with the user 604 may be provided to the user 604. Additionally, certain intelligence may be incorporated into a content management system 608 to identify other offers 614 to be provided to a user or for restricting offers 614 that are to be provided to a user. For example, certain areas of the geographic regions may be associated with a high degree of content piracy. If a geographical region 606 associated with a user 604 identifies one of these high-piracy regions (e.g., the user 604 is found to have an IP address identifying a high-piracy region), certain offers, such as those that include high-resolution video formats of the sought after content, may be filtered from the offers 614 provided to the user 604 even though those filtered offers are designated for a super-region that includes the geographical region 606 associated with the user 604.

Figure 7:
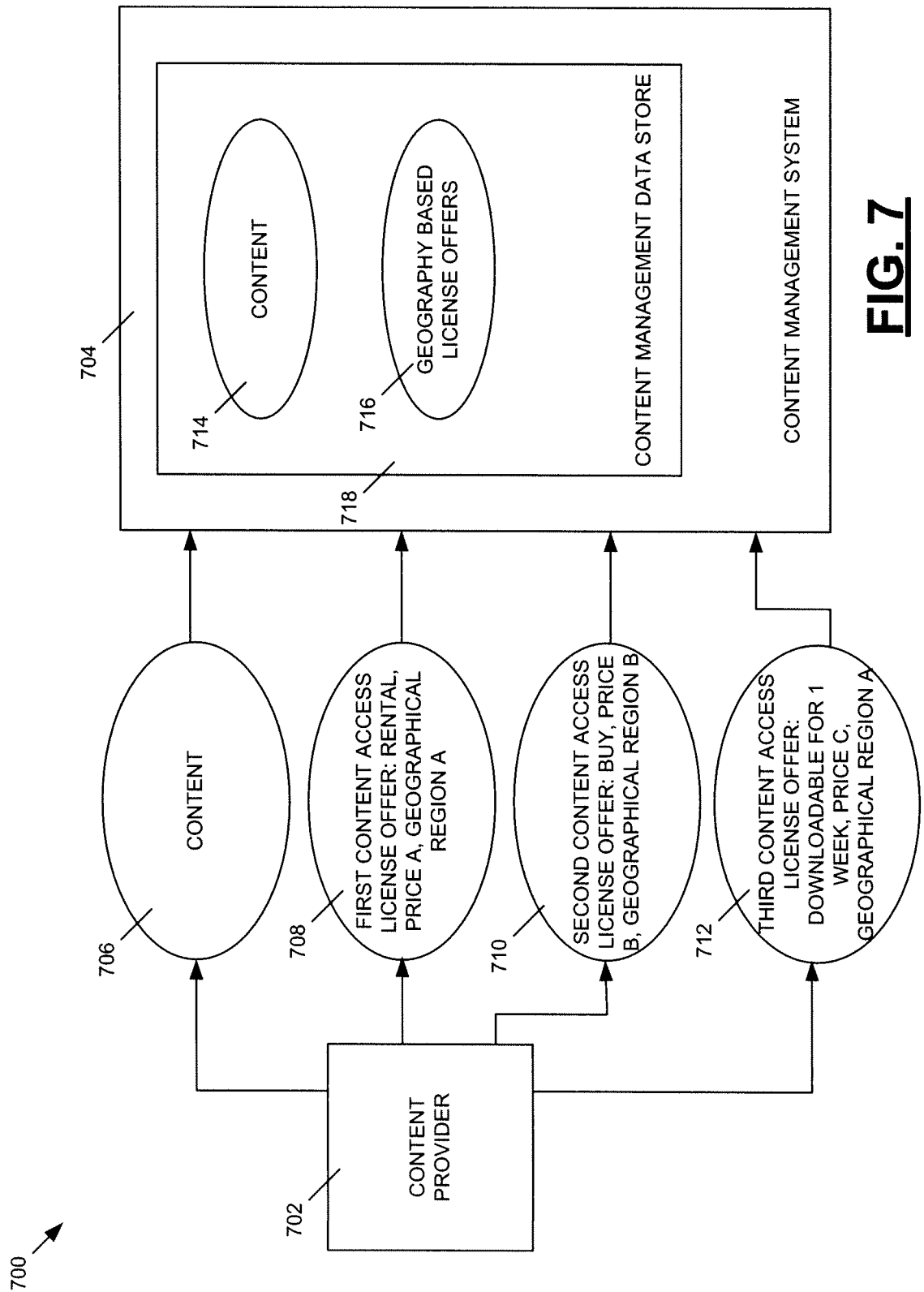
FIG. 7 is an exemplary block diagram identifying example geography based license offer contents provided by a content provider to a content management system.

FIG. 7 is a block diagram identifying example geography based license offer contents provided by a content provider 702 to a content management system 704. In addition to supplying content 706 for distribution, the content provider 702 may provide one or more geography based content access license offers 708, 710, 712 to the content management system 704 that may be stored as content 714 and geography based license offer 716 records in a content management data store. In typical embodiments, each geography based content access license offer 708, 710, 712 comprises a type of license associated with the offer, a price that a user must pay to accept the offer, and the geographical regions for which the geography based content access license offer 708, 710, 712 is valid. For example, a first content access license offer 708 associated with the content 706 may detail a rental license available for price A that is valid in geographical region A. A second content access license offer 710 may include an option to buy the content 706 for price B that is valid in geographical region B. The content provider 702 may also provide a third content access license offer 712 that includes a license that allows downloading of the content 706 for one week for price C that is valid in geographic region A.

Figure 8:
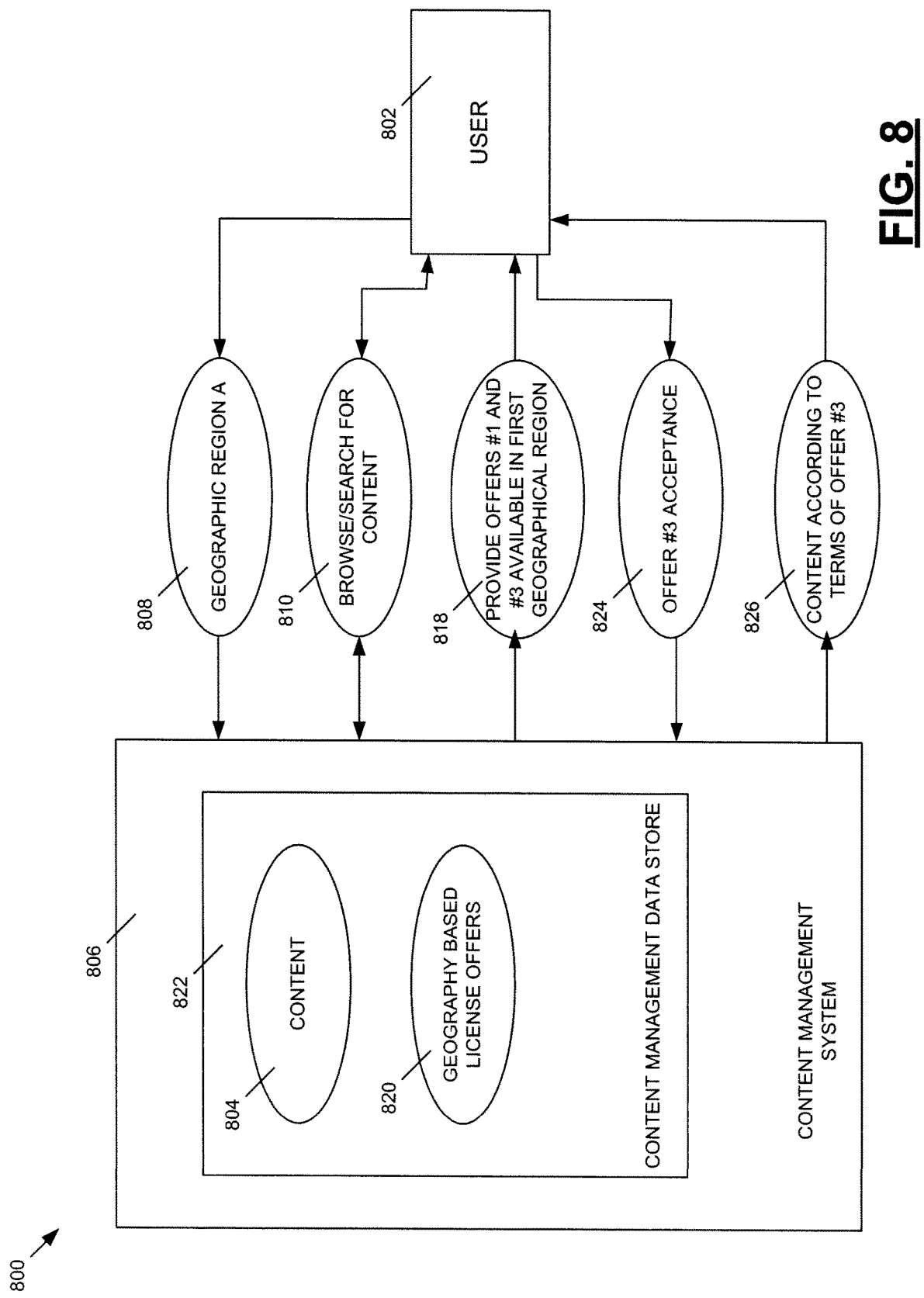
FIG. 8 is an exemplary block diagram depicting a user accessing content via content access license offers valid in the geographical region associated with the user.

FIG. 8 is a block diagram depicting a user 802 accessing content 804 via content access license offers valid in the geographical region associated with the user 802. In this example, the user 802 is identified by the content management system 806 as being associated with geographic region A, as shown at 808. The user 802 may browse for, search for, or otherwise be directed to a content description web page at 810. At the content description web page, the first and third content access license offers described with respect to FIG. 7 are provided to the user 802 at 818 from the pool of geography based license offers 820 in the content management data store 822 because the first and third offers are valid for geographical region A that is associated with the user 802. In this example, the access license offer #2 is not provided to the user 802 because the user is not in the geographic region associated with license offer #2. Upon review of the offers provided at 818, the user 802 decides on the third offer and indicates acceptance at 824. The user 802 is provided with the content 804 according to the terms of the third offer, as indicated at 826.

Figure 9:
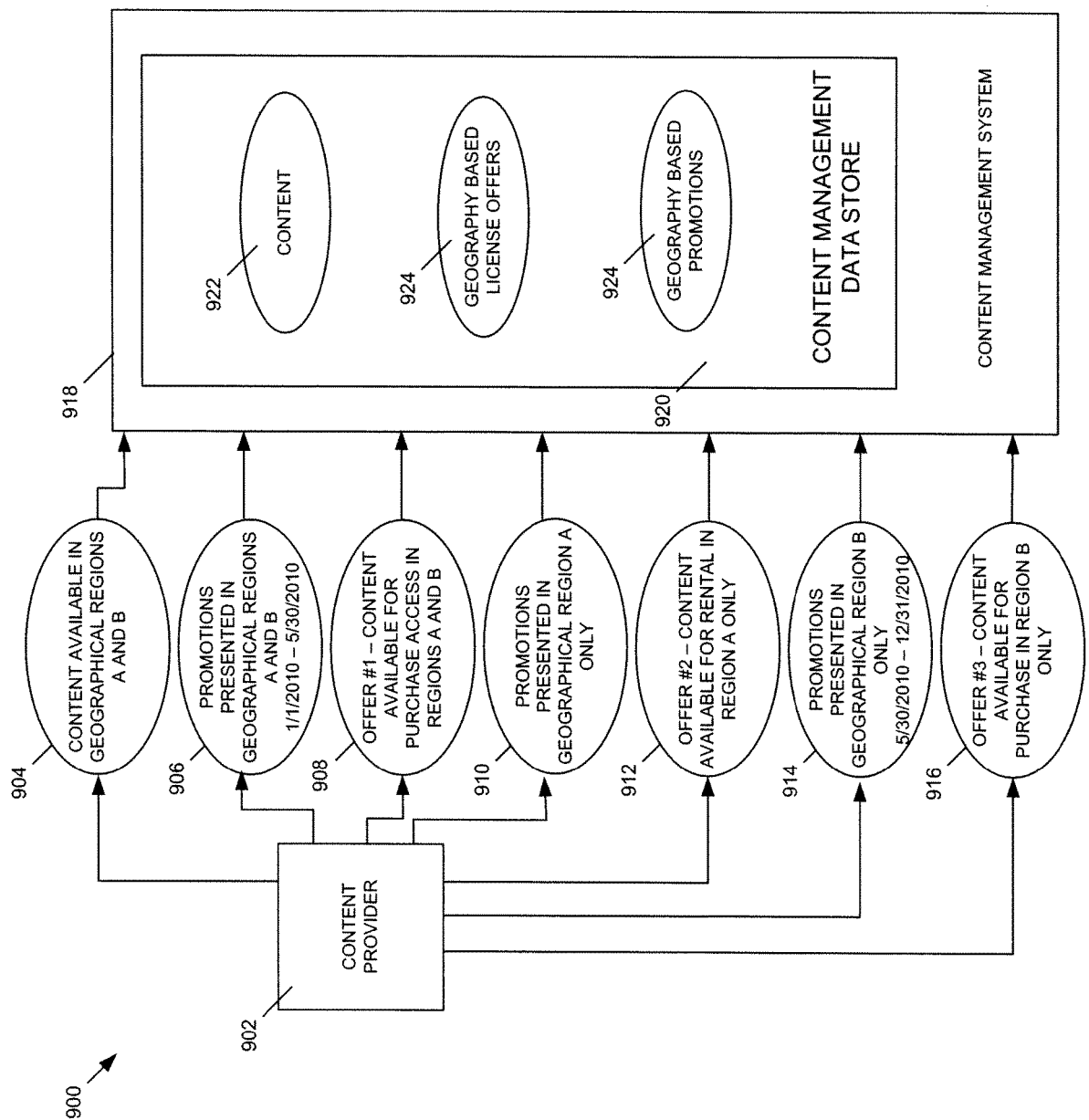
FIG. 9 is an exemplary block diagram depicting a content provider identifying the content, scheduled and unscheduled (perpetual), geographic based promotions, and geographic based content access license offers.

FIG. 9 is a block diagram depicting a content provider 902 identifying the content, scheduled and unscheduled (perpetual), geographic based promotions, and geographic based content access license offers. A content provider 902 may wish to create the promotion and enable availability of content in different geographical regions for a variety of reasons. In one example, the content provider may only have contractual rights to make the content available in a few regions. In another example, a content provider 902 may wish to focus his marketing in a single geographic region at a time for maximum effect. In another example, the content provider 902 may have identified a particular way that content must be packaged in order to best address the consumer demand within that geographic region. In another example, the filmmaker may have promotional offers that would only be available in certain geographic regions (i.e. upgrade from a license that is only available in a specific geographic region). Thus, certain content 904 may be promoted via the content management system 918 as well as via other promotions which are handled outside of the system, such as the appearance of actors on talk shows, in a first geographical area for a first time period prior to and concurrently with the release of the content 904. The marketing and release of the content may then proceed in geographic region B, such that marketing efforts may be concentrated in one or a subset of all geographic regions for greater effect.

In some embodiments, the embodiment depicted in FIG. 9 is facilitated by a lookup table built by the content provider 902 before user requests are received. In such an example, the content provider 902 prepares a schedule of the promotion and availability of content in different geographical regions at different times and this table is stored by system 906. Then, as user requests for material provided by the content provider 902 are received, the system 906 uses the lookup table to determine which content offered by the content provider 902 may be offered to the user on the basis of the geographic region associated with the user. The content provider can adjust the schedule on the look up table over time.

For example, in FIG. 9, the content provider 902 provides content 904 and a plurality of geography based license offers 908, 912, 916 to the content management system 918 for storage in a content management data store 920. One content access license offer 908 is associated with both geographical region A and B, one content access license 912 is associated exclusively with geographical region A, and one content access license 916 is associated exclusively with geographical region B. The scheduled promotion 906 makes promotional options (e.g., ads triggered by search results) for the content 904 available in geographical regions A and B from Jan. 1, 2010, through May 30, 2010. The promotion 910 makes a promotional option available perpetually for users in geographical region A. (e.g., upgrade of offer 912 to offer 908). The promotion 914 makes a promotional option available to users in geographical region B from May 30, 2010 to Dec. 31, 2010. (e.g., users who have purchased offer 916 can upgrade to offer 908 at a discount). Thus, promotional materials will influence demand and conversions for global offers 908 and content 904 available to consumers across multiple territories simultaneously. The content 904, geography based license offers 908, 912, 916 and geography based promotions 906, 910 and 914 are provided to the content management system 918, where they may be stored as content records 922, geography based license offers 924 and geography based promotions 916 respectively.

Figure 10A:
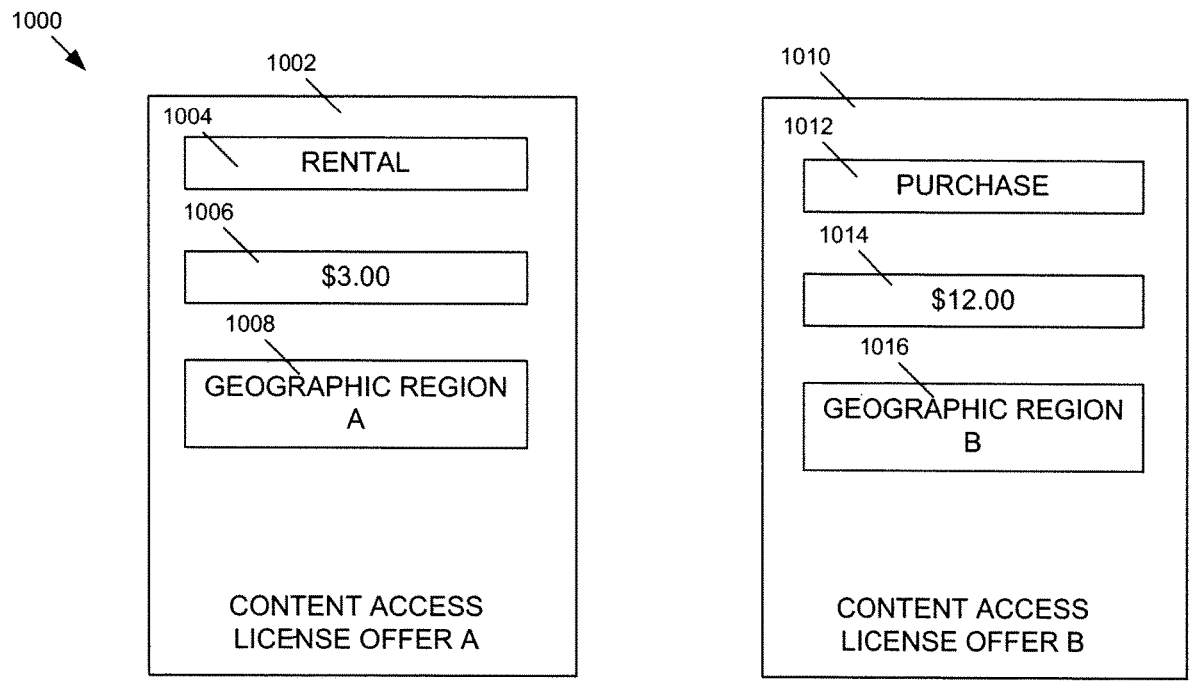
FIGS. 10A and 10B depict exemplary geographic based content access license offers for a content item.
Figure 10B:
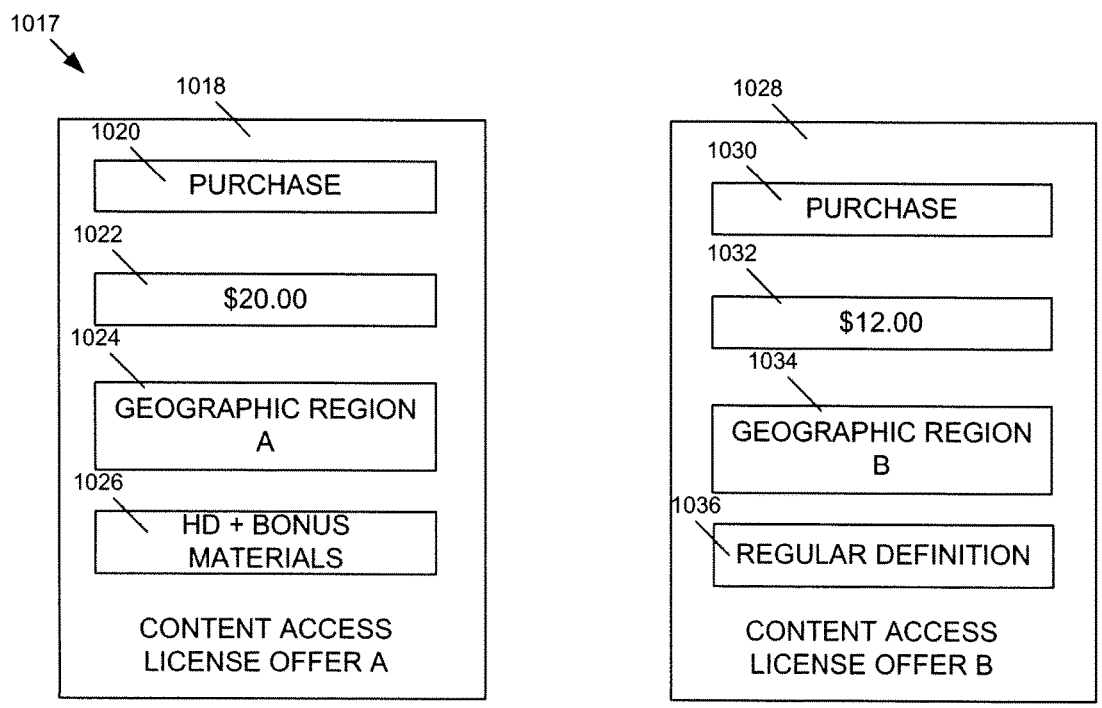

FIGS. 10A and 10B depict exemplary geographic based content access license offers for a content item. In FIG. 10A, a content access license offer A 1002 includes an offer to rent 1004 the content for $3.00 1006 in geographic region A 1008. Content access license offer B 1010 offers to enable purchase 1012 of the content for $12.00 1014 in geographic region B 1016. A content access license offer may also include a variety of other options. For example, in FIG. 10B, content access license offer A 1018 enables purchase 1020 of the content for $20.00 1022 in geographic region A 1024. Content access license offer A 1018 also includes a high definition version of the content plus bonus materials, as indicated at 1026. Content access license offer B 1028 enables purchase 1030 of the content for $12.00 1032 in geographic region B 1034. Content access license B 1028 offers the content in a regular definition form 1036. In another example, the same content with the same options could be offered to different geographical regions for different prices to take advantage of different tolerances to price in those different geographical regions.

Figure 11:
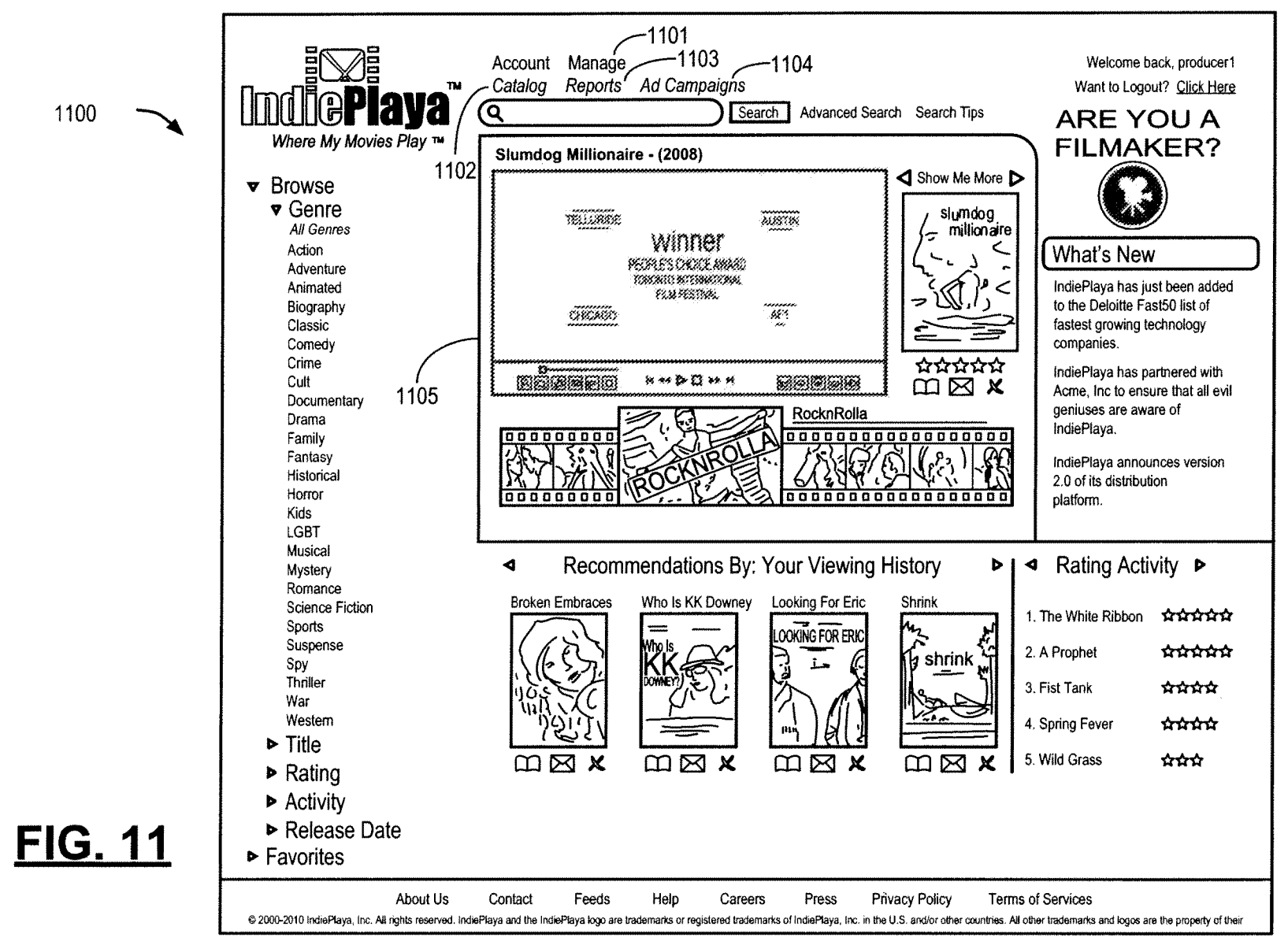

FIGS. 11-16 detail exemplary interfaces for enabling a content provider to supply content and geography based content access license offers to a content management system. FIG. 11 shows an exemplary interface 1100 for use by a content creator or provider. Using the interface 1100, the content creator can manage content. For example, the content interface 1100 can include one or more controls for managing 1101 content. By clicking on the content management link 1101, controls for managing content may be provided that can include a catalog control 1102, a reports control 1103, and an ad campaign control 1104. Additionally, the interface 1100 can include a viewing area 1105 for interacting with content.

Figure 12:
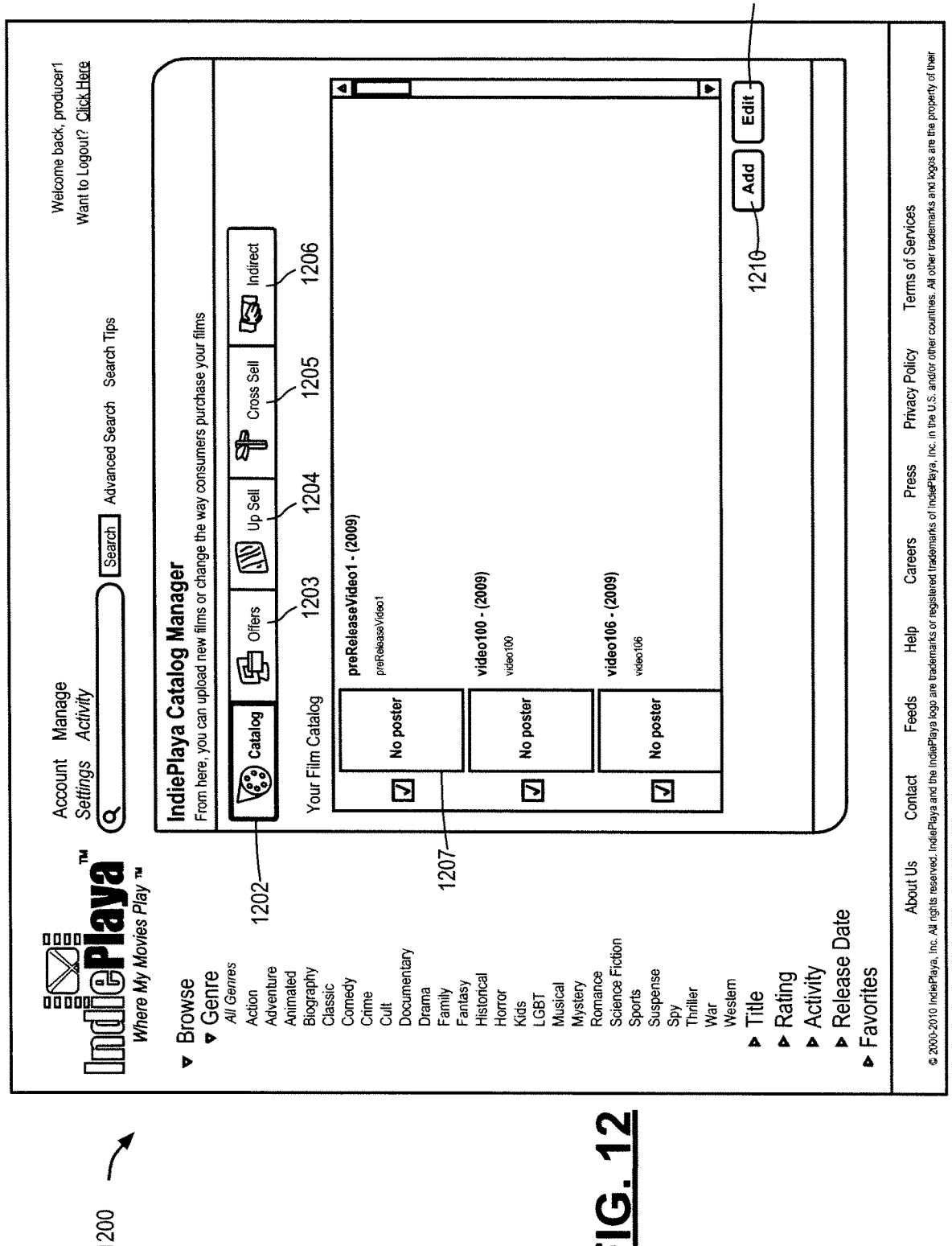

FIG. 12 depicts an exemplary interface 1200 providing a list 1207 of content for management as well as links to utilities for managing that content. Upon selection of the catalog tab at 1202, a content provider may be presented a list 1207 of that provider's content. A content provider may add or edit items in the content list 1207 via controls 1210 and 1211, respectively. Upon selection of a content item in the list 1207 of content items, the content provider may be provided options for managing offers related to the selected content item via link 1203, up-sell options for the selected content via link 1204, cross-sell options for the selected content via link 1205 and indirect sell options for the selected content via link 1206.

Figure 13:
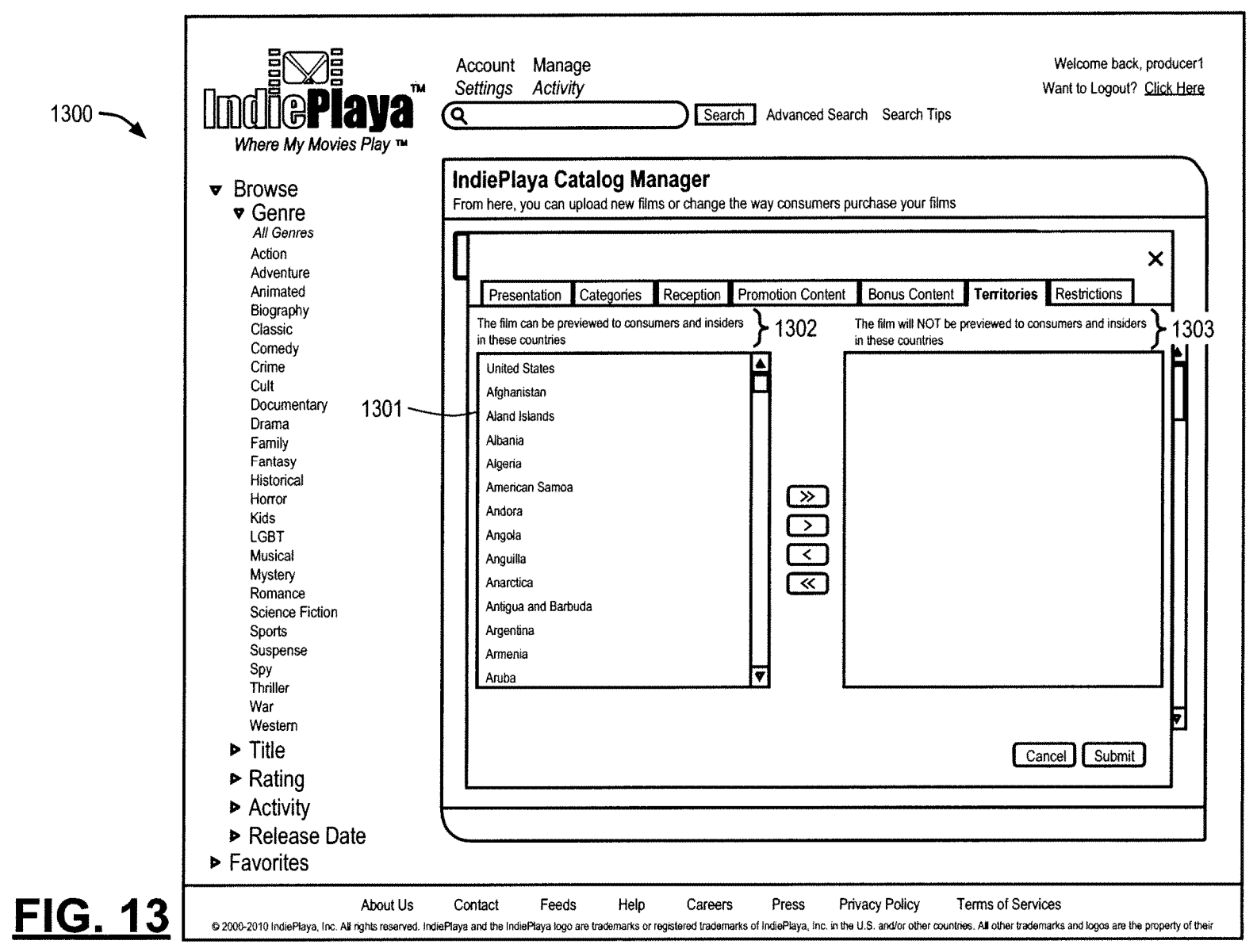

FIG. 13 depicts an exemplary user interface 1300 for identifying geographical regions for which content is available. Such an interface 1300 may, for example, be accessed by selecting the edit control 1211 on a content listing interface, such as is depicted in FIG. 12. The content provider may then specify geographical regions where the content is to be made available, as indicated at 1302 and geographical regions where the content is not to be available, as indicated at 1303, by moving geographic regions between the left and right panes, such as by using the arrow controls 1305. While the geographic region options depicted in FIG. 13 list countries for selection, other size geographical regions may be used as well as or in addition to the countries listed.

Figure 14:
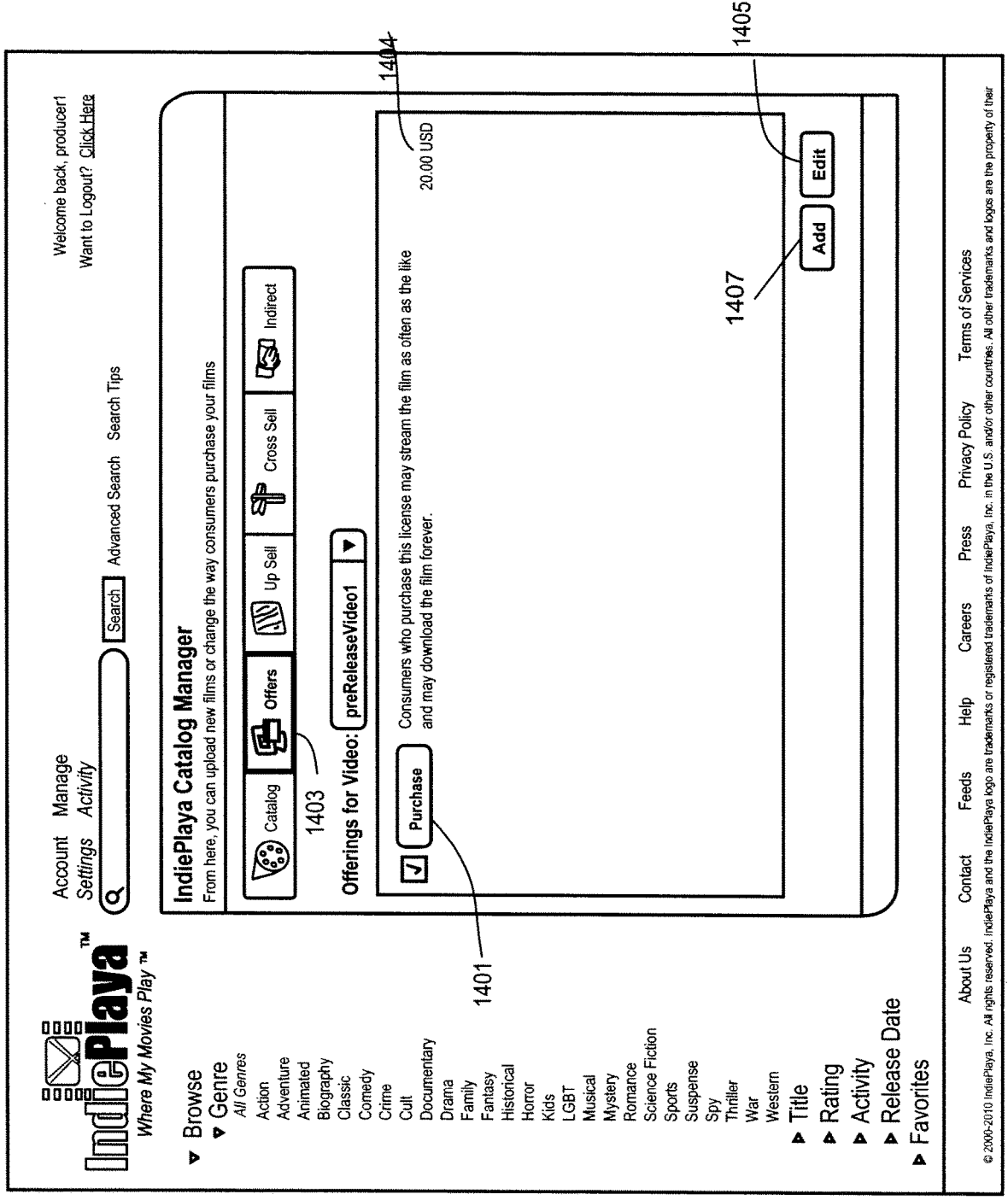

FIG. 14 depicts an exemplary user interface 1400 for managing a list of offers related to a content item. The offer management interface 1400 may be accessed by selecting the "Offers" control 1403 after selecting the preReleaseVideo1 content. In the example of FIG. 14, the content video, preReleaseVideo1, currently has one offer associated with the content. As indicated at 1401, the one offer associated with the content is a purchase option that allows consumers to stream the film as often as they like and download the film forever. The cost of the offer is $20.00, as indicated at 1404. The purchase offer 1401 may be edited via the edit control at 1405, and additional offers may be added via the add control at 1407.

Figure 15:
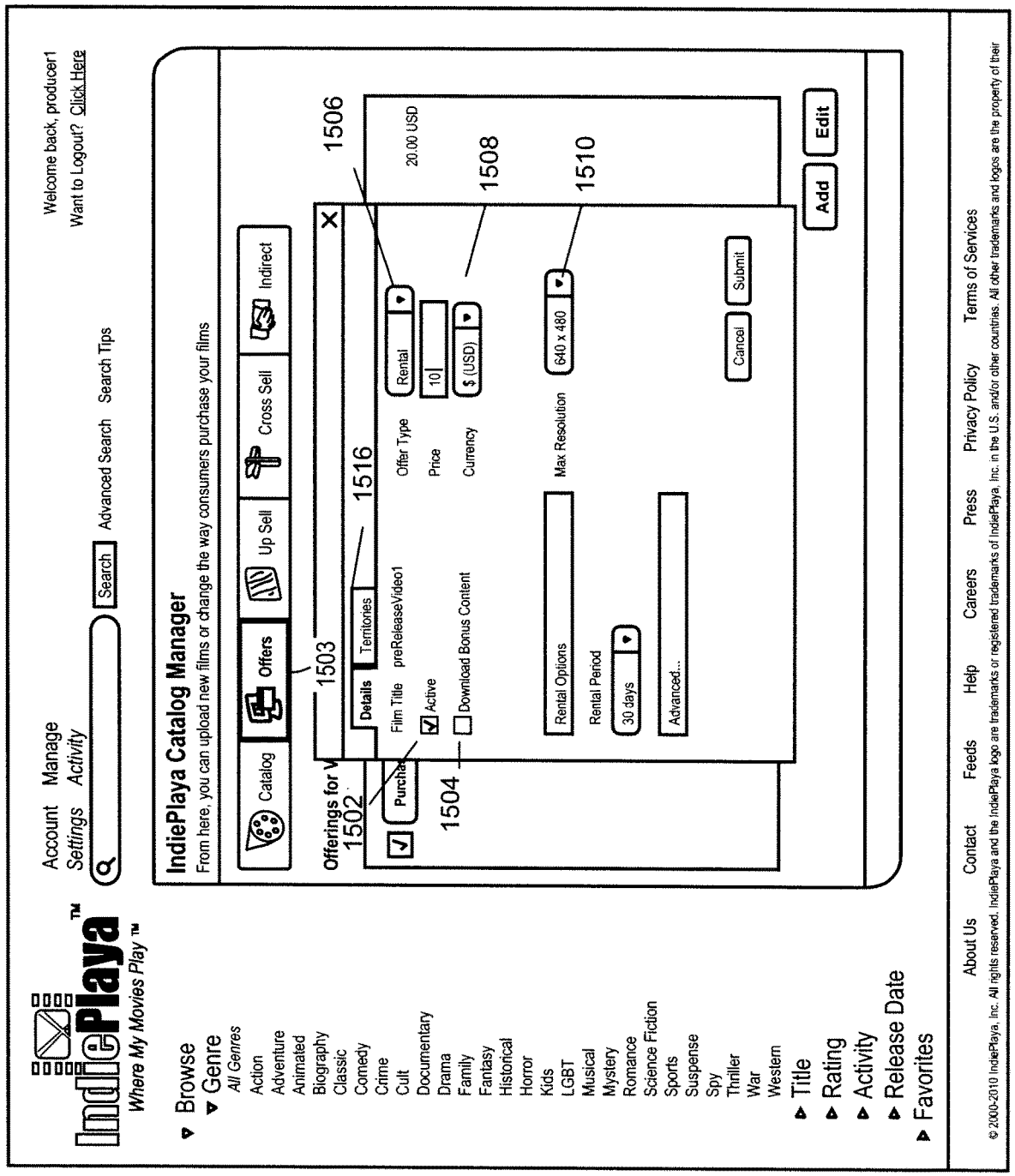

FIG. 15 depicts an offer definition user interface 1500 where a content provider may add a new offer for a content item or edit an existing offer. The content provider may indicate whether the offer is active or not at 1502, enabling saving of old offers or creation of offers prior to activating them. Control 1504 indicates whether bonus content is to be included with the current offer. At 1506, the license type is defined, and at 1508, the price and the currency of the price are defined. It may be desirable to set a currency in which the transaction is to be completed to avoid revenue variances based on day to day currency value fluctuations. At 1510, a resolution at which the content is to be provided for the current offer may be selected. The territories tab at 1516 activates an interface for identifying in which geographical regions the offer is valid.

Figure 16:
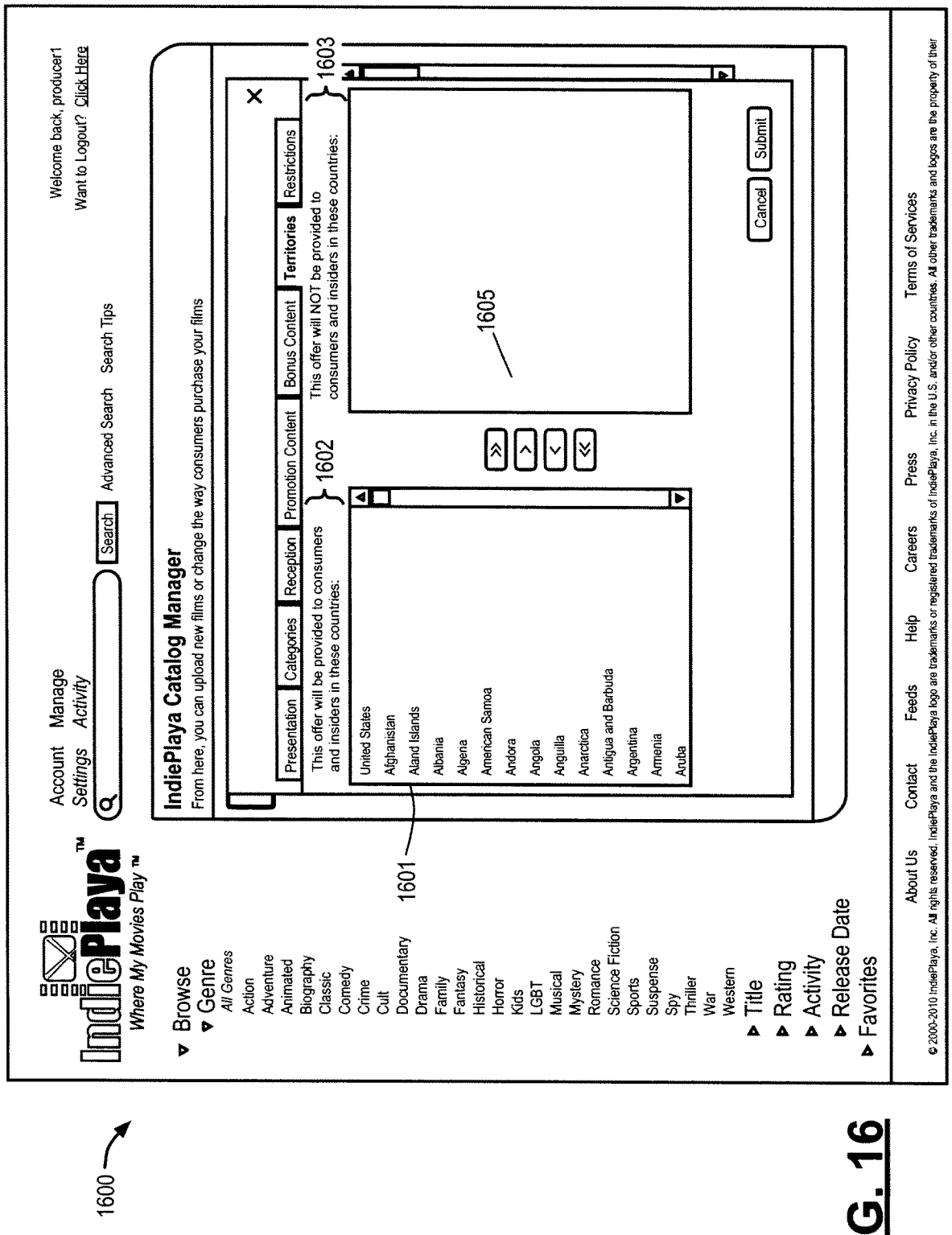

FIG. 16 depicts an exemplary user interface 1600 for identifying geographical regions for which an offer is valid. Such an interface 1600 may, for example, be accessed by selecting the territories tab 1610 on an offer definition interface, such as is depicted in FIG. 15. The content provider may then specify geographical regions where the offer is valid, as indicated at 1602 and geographical regions where the offer is not valid, as indicated at 1603, by moving geographic regions between the left and right panes, such as by using the arrow controls 1605. While the geographic region options depicted in FIG. 16 list countries for selection, other size geographical regions may be used as well as or in addition to the countries listed.

Figure 17:
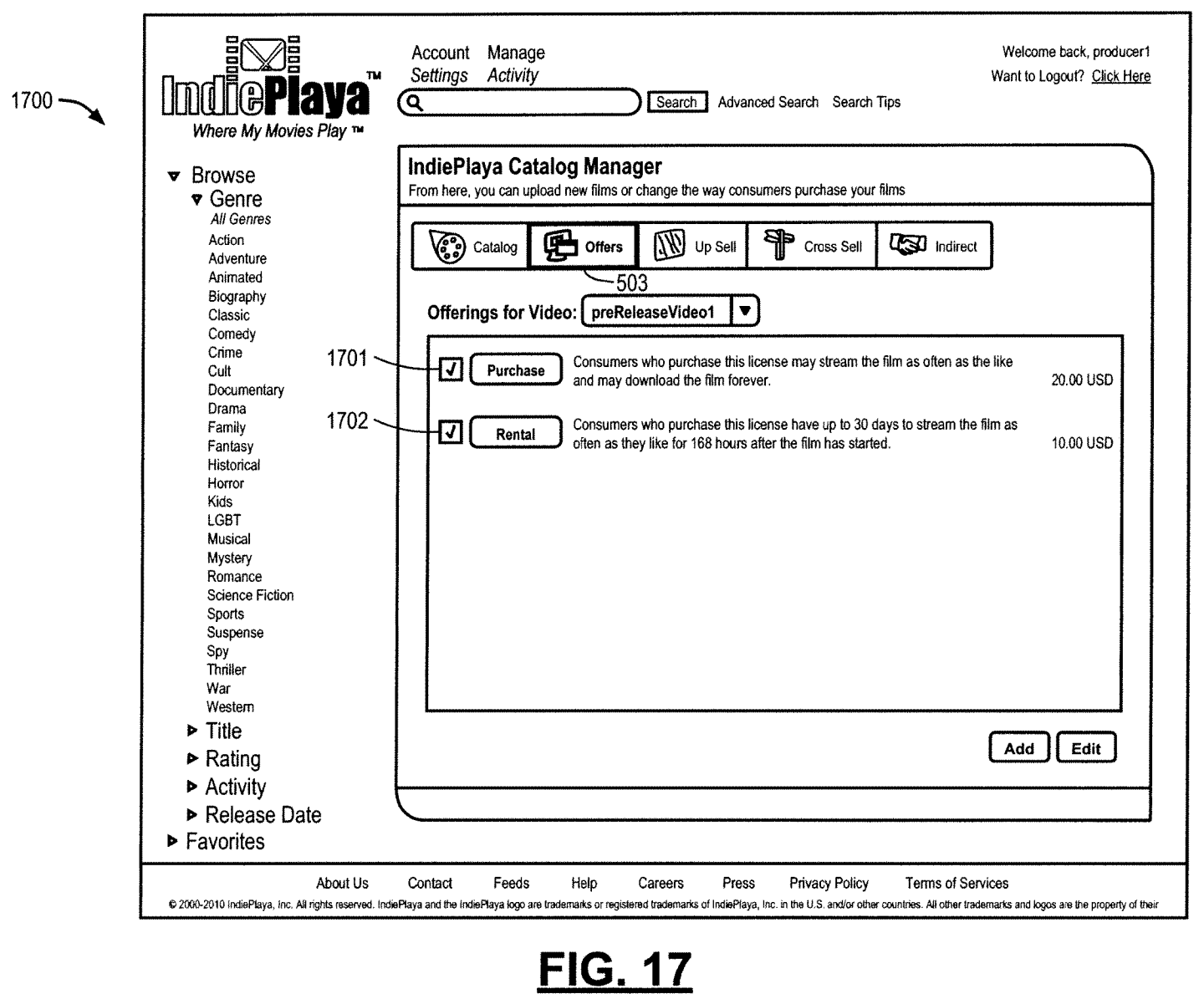

FIG. 17 depicts an exemplary user interface 1700 that provides of a second offer 1702 for rental of the content. Upon creation of a new offer for a piece of content via an offer definition interface, such as the one depicted in FIGS. 15 and 16, the newly created offer is added to the list of available offers for a piece of content in addition to previously created offers. In the example of FIG. 17, the new rental offer 1702 provides an offer where consumers who purchase the license have up to 30 days to stream the film as often as they like for 168 hours after the film has started. This rental offer 1702 is listed along with the previously existing purchase offer 1701.

In some implementation, a user can be concurrently presented with one or more offers. Additionally, in these implementations, one or more additional offers can be dynamically generated and presented to a user based upon user interaction with the system. For example, a content creator can dynamically create an offer based upon a user selection. In some implementations, when a user executes a first offer (e.g., rents content) and accepts an offer to execute a second offer (e.g., purchase the rented content), the first license (corresponding to the first offer) can expire upon the execution (e.g., acceptance) of the second offer. In other implementations, when a user executes a first offer (e.g., purchase of a standard definition version of a film) and accepts an offer to execute a second offer (e.g., rent a high definition version of the film), the first license (corresponding to the first offer) can run concurrently with the second offer. In still other implementations, when a user executes a first offer (e.g., purchase of a standard definition version of a film) and accepts an offer to execute a second offer (e.g., rent a high definition version of the film), the first license (corresponding to the first offer) can be suspended for the duration of the second offer. For example, the first license can be selectively or automatically reinstated upon completion of the second offer.

Additionally, in some implementations, offers can be activated and deactivated. For example, an offer can be activated or deactivated manually (e.g., by the content creator), automatically (e.g., by the system), or in accordance with one or more predefined settings (e.g., set by a content creator).

Figure 18:
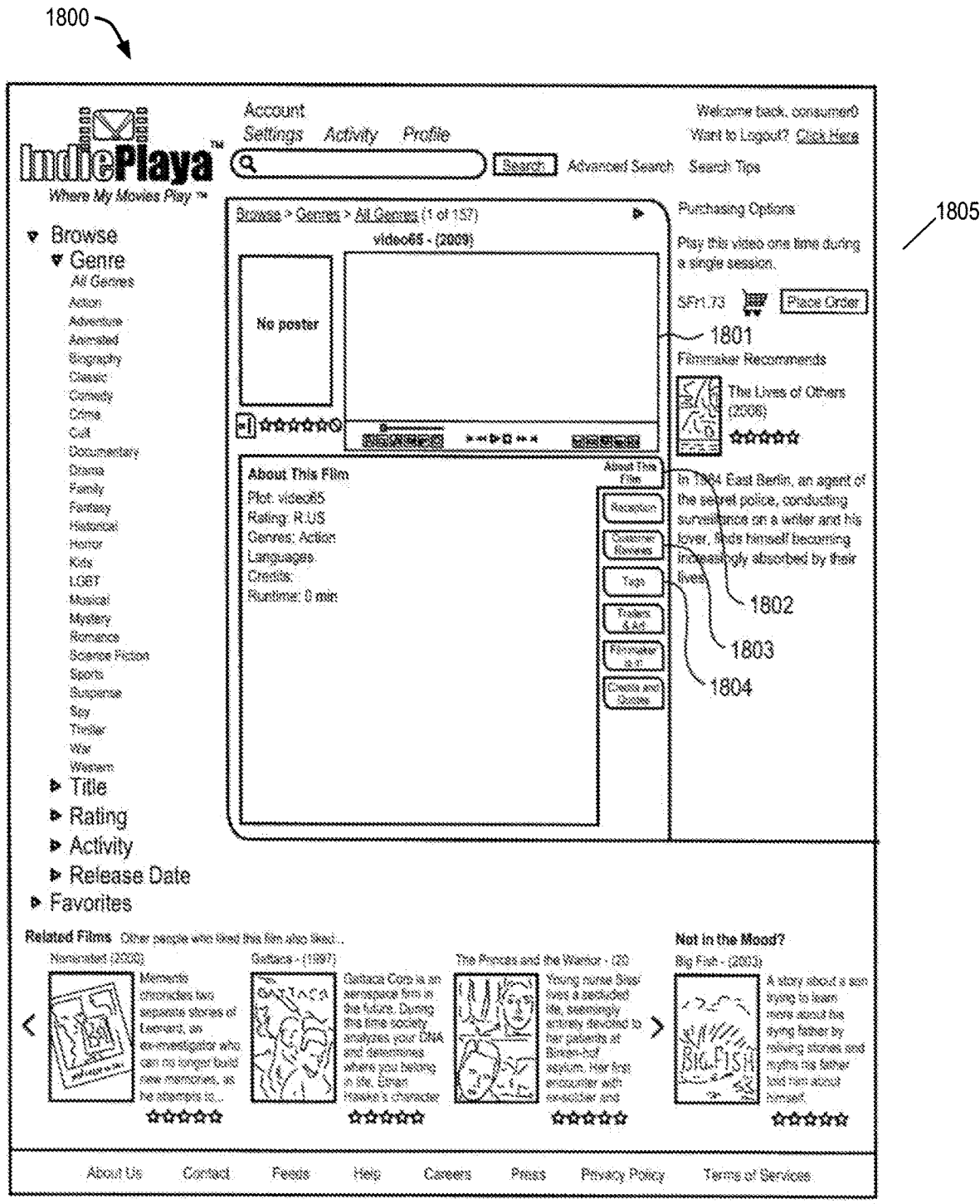
Figure 19:
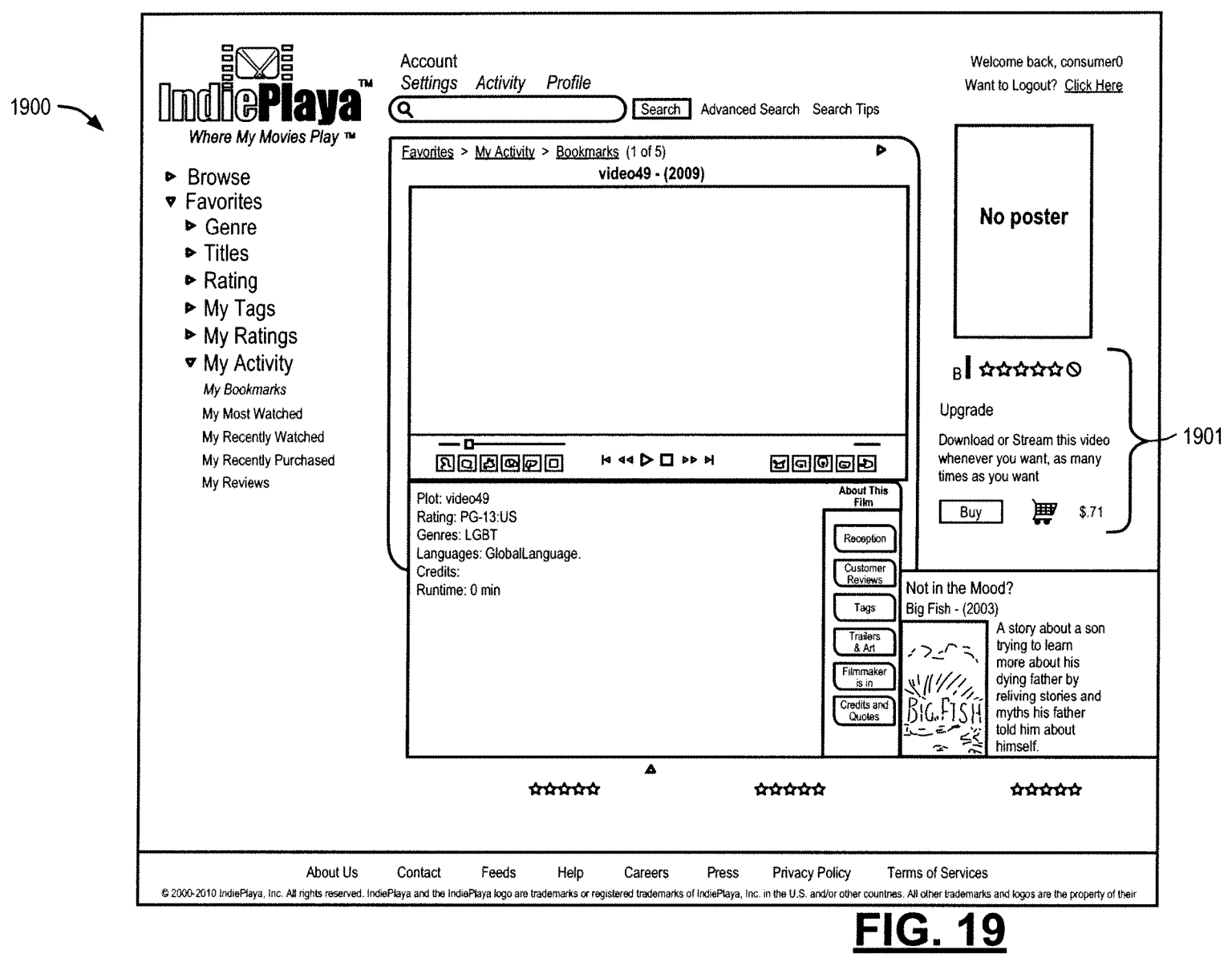

FIGS. 18 and 19 depict exemplary interfaces for providing geography based content access license offers to users to facilitate the acquiring of content by a user. FIG. 18 depicts an exemplary user interface 1800 where a user is provided certain promotional content such as a description of the film 1802, consumer reviews about the film 1803, and keyword tags about the film 1804. The user may also be provided a viewing window 1801 for viewing promotional materials, such as a trailer, or for viewing the content itself. The user is also provided a listing of one or more offers at 1805 describing content access license offers that are valid for the geographical area associated with the user. In the example of FIG. 18, the user is provided with an offer to purchase the video for a single session viewing at 1805.

FIG. 19 depicts an exemplary user interface 1900 for a user who has purchased the content named "video49." In this example, the geographic region associated with the user includes an up-sell offer for upgrading a previously made purchase, as identified at 1901. The listed upgrade is a purchase option that would allow the user to download or stream a video whenever the user wishes, as many times as the user wishes. The user may choose to accept this up-sell by clicking the "Buy" button, and the content would then be provided according to the terms of the newly accepted offer.

Figure 20:
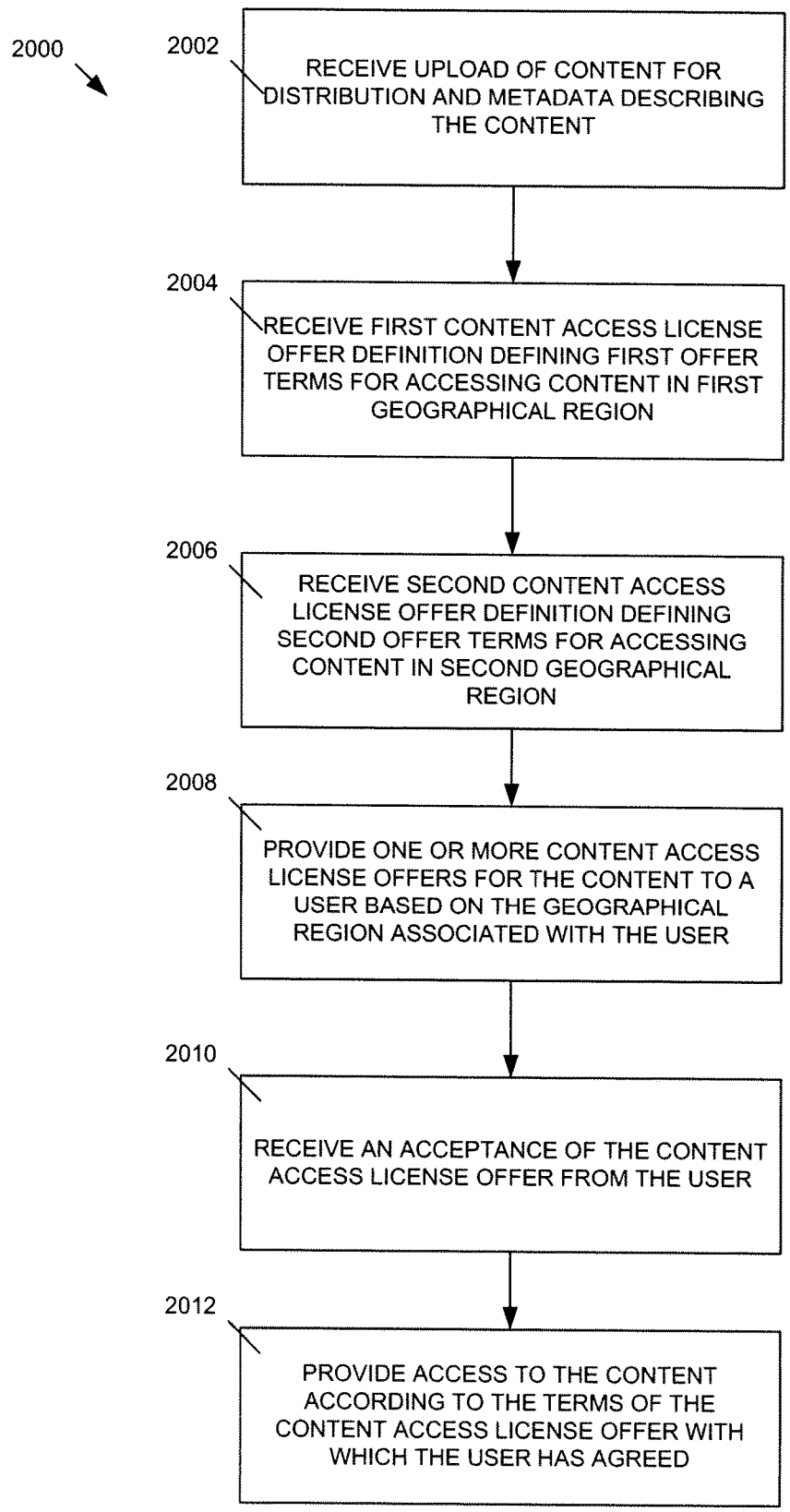
FIG. 20 is an exemplary flow diagram depicting a method of providing user access to content via a customized content access license offers for a plurality of a plurality of geographical regions where a customized content access license offer is provided to a user based on a geographical region associated with the user.

FIG. 20 is a flow diagram depicting a method of providing user access to content via a customized content access license offers for a plurality of geographical regions where a customized content access license offer is provided to a user based on a geographical region associated with the user. An upload of content for distribution and metadata describing the content is received at 2002. At 2004, a first content access license offer definition is received defining first offer terms for accessing the content in a first geographical region. The first offer terms include a license type, a price, and a first geographical region where the first content access license definition is valid. At 2006, a second content access license offer definition is received defining second offer terms for accessing the content in a second geographical region. The second offer terms including a license type, a price, and a second geographical region where the second content access license definition is valid. At 2008, a user is provided one or more content access license offers for the content based on the geographical region associated with the user, and at 2010, an acceptance of a content access license offer is received from the user. At 2012, the user is provided access to the content according to the terms of the content access license offer with which the user has agreed.

Figure 21:
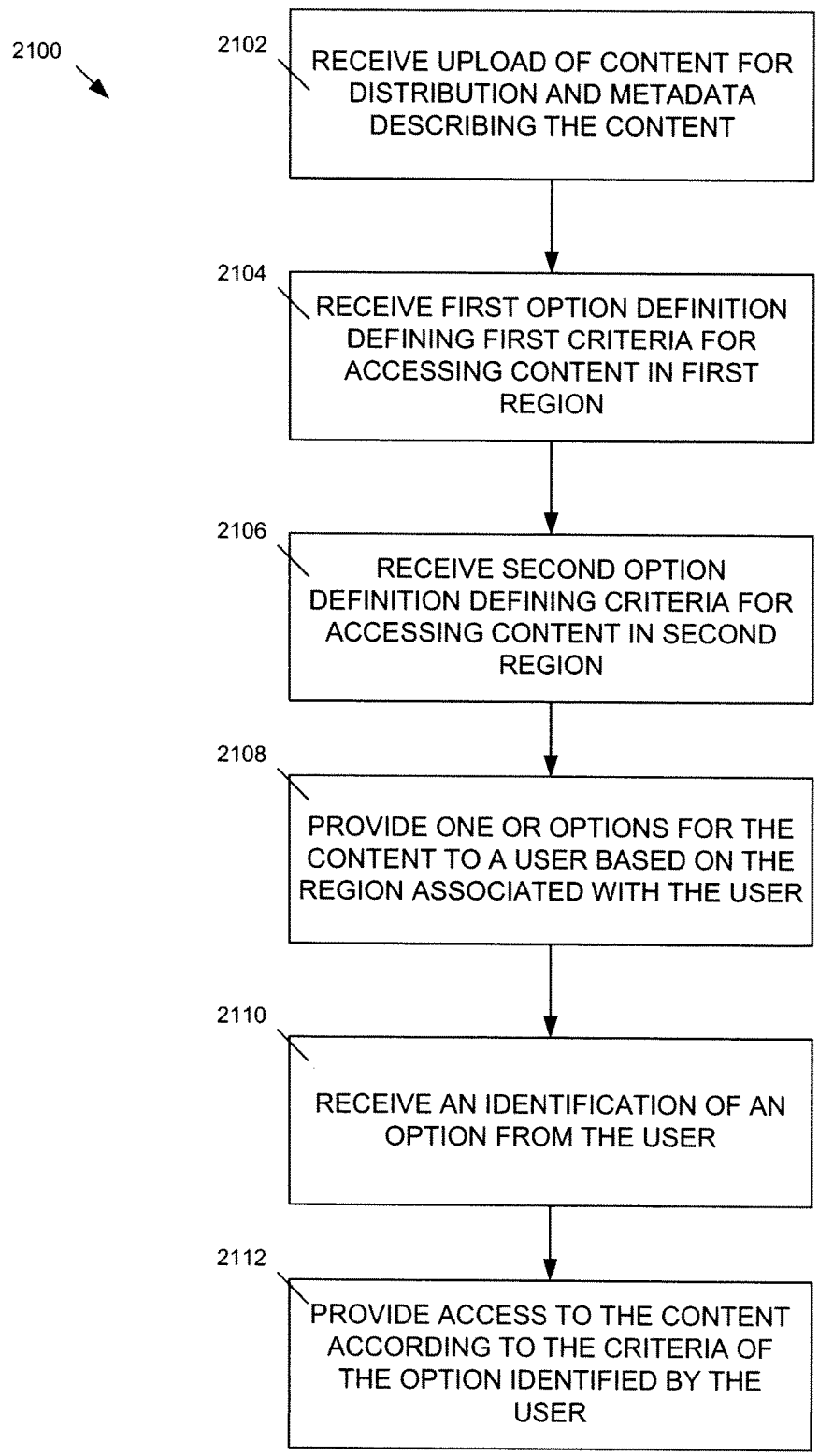
FIG. 21 is an exemplary flow diagram depicting a processor-implemented method of providing user access to content via customized options for a plurality of regions, a customized option being provided to a user based on a region associated with the user.

FIG. 21 is a flow diagram depicting a processor-implemented method of providing user access to content via customized options for a plurality of regions, a customized option being provided to a user based on a region associated with the user. Content for distribution and metadata describing the content are received at 2102 using one or more processors, where the received content and metadata are stored in a computer-readable memory. At 2104, a first option definition is received that defines first criteria for accessing the content in a first region, where the first criteria include an option type, a value, and a first region where the first option definition is valid. At 2106, a second option definition is received defining second criteria for accessing the content in a second region, where the second criteria include an option type, a value, and a second region where the second option is valid. At 2108, one or more options for the content are provided to the user based on the groin associated with the user. An identification of an option is received from the user at 2110, and at 2112, access to the content is provided to the user according to the criteria of the option that the user has identified.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

In some implementations, an insider can be any third-party who exhibits an interest in one or more of the following: processing, marketing, promotion, management, packaging, merchandising, fulfillment, delivery, distribution, licensing, or enforcement of content and/or content-related data. In some implementations, an insider can be considered a content provider. A content provider is anyone who exhibits an interest in distributing, licensing, and/or sub-licensing content and/or content-related data. A content provider can include, but is not limited to, a distributor, a sub-distributor, and a licensee of content and/or content-related data. In some implementations, a content provider can perform any and all functions associated with the systems and methods provided herein. It should be understood that any and all functions performed by a content creator can also be performed by a content provider.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed o a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

It is claimed:

1. A processor-implemented method of transmitting content from a multi-content-provider platform over a computer network, comprising:
   receiving a plurality of options for accessing a particular piece of content including a first subset of options associated with a first region and a second subset of options associated with a second region, the plurality of options being based on an Internet domain of a user being is associated with the first region, wherein a different Internet domain is associated with the second region;
   automatically adjusting, without human intervention and based on a searchable index, a particular one of the first subset of options based on activity of other users who have accessed the particular content as specified by the index, including activity of those other users before and after the other users accessed the particular content and based on an account history for a user accessing content other than the particular content, the index comprising a hierarchical arrangement of weighted attributes corresponding to content available by way of the platform, the weighted attributes being used to generate the first subset of options;
   providing, via a graphical user interface menu available by way of the network, the first subset of options after the automatic adjustment;
   receiving, via the graphical user interface, an identification of an option in the first subset from the user; and
   transmitting, by the platform over the network for playback on a computing device associated with the user, the particular content from the platform to the user via the network according to a criterion of the option that the user has identified.

2. The method of claim 1, wherein the detected Internet Domain comprises an IP address of the user and the automatically detecting comprises detecting a physical location of the network based on the IP address.

3. The method of claim 1, wherein options from which the first subset and the second subset are provided are defined by providing, in the graphical user interface, an item user interface for defining access options for an individual content item that includes controls for selection, on an item by item basis: individual content items, one of a plurality of regions, and an option type for defining selectable access options for the particular content and other content items, the option type indicating a time period for access that begins upon the platform transmitting the particular content to the user via the network.

4. The method of claim 3, wherein for each of a plurality of content items for each of a plurality of regions, one or more access options are specifically selected using the item user interface.

5. The method of claim 3, wherein options from which the first subset and the second subset are provided are defined by:
   receiving at the platform a first selectable access option definition from the content provider via the item user interface defining first criteria for accessing the particular content in a first region in the plurality of regions, the first criteria including a first option type and the first region where the first option definition is valid;
   receiving at the platform a second selectable access option definition from the content provider via the item user interface defining second criteria for accessing the particular content in a second region in the plurality of regions, the second criteria including a second option type that differs from the first option type and the second region where the second option definition is valid;
   wherein first and second selectable access options are provided on a per item basis by a plurality of different content providers associated with different pieces of content.

6. The method of claim 1, further comprising: receiving at the platform for distributing content provided by a plurality of unrelated content providers an upload of the particular piece of content from a content provider for distribution, the received particular content being stored in a computer-readable memory.

7. The method of claim 1, further comprising generating the index by:
   first monitoring and indexing audience interaction activity on a website up to and including an access of the particular content; and
   second monitoring and indexing audience interaction on the website following an access of the particular content.

8. The method of claim 1, wherein said automatically adjusting is further based on the user's account history regarding access of content other than the particular content.

9. The method of claim 1, wherein the particular content is transmitted from the platform to the physical location of the network for display on a graphical user interface of the user.

10. The method of claim 1, wherein a signal is transmitted from the platform to the user that disables access to the particular content at the conclusion of the time period for access associated with the identified option.

11. The method of claim 1, wherein a second user associated with a third region is not provided with any options for accessing the particular content.

12. The method of claim 1, wherein a first option in the first subset includes a time period of validity.

13. The method of claim 12, wherein the time period of validity is preceded by a period where materials for the particular content, but not access to the particular content, are available in the first region.

14. The method of claim 12, wherein a second user associated with the second region cannot access the particular content during the time period of validity.

15. The method of claim 1, wherein one of the first subset options is associated with a higher video resolution than is available on any of second subset option.

16. The method of claim 1, wherein one of the first subset options is associated with a different access type than is available on any of second subset option.

17. A system for transmitting content from a multi-content-provider platform over a computer network, comprising:
one or more data processors;
one or more non-transitory computer-readable mediums encoded with instructions for commanding the one or more data processors to execute steps of a method comprising:
receiving a plurality of options for accessing a particular piece of content including a first subset of options associated with a first region and a second subset of options associated with a second region, the plurality of options being based on Internet domain of a user being associated with the first region, wherein a different Internet domain is associated with the second region;
automatically adjusting, without human intervention and based on a searchable index, a particular one of the first subset of options based on activity of other users who have accessed the particular content as specified by the index, including activity of those other users before and after the other users accessed the particular content and based on an account history for a user accessing content other than the particular content, the index comprising a hierarchical arrangement of weighted attributes corresponding to content available by way of the platform, the weighted attributes being used to generate the first subset of options;
providing, via a graphical user interface menu available by way of the network, the first subset of options after the automatic adjustment;
receiving, via the graphical user interface, an identification of an option in the first subset from the user; and
transmitting, for playback on a computing device associated with the user, the particular content from the platform to the user via the network according to a criterion of the option that the user has identified.

18. A system for transmitting content from a multi-content-provider platform over a computer network, the system comprising:
at least one hardware processor; and
memory storing instructions which, when executed by the at least one hardware processor, result in operations comprising:
automatically detecting a region associated with a remote user based on interaction of the user with a network, wherein automatically detecting comprises detecting a physical location of the network based on an IP address of the user;
providing, via a graphical user interface menu via the network, a first subset containing a plurality of options for a particular piece of content from the platform to the remote user based on the region associated with the user, wherein a second user in a different region is provided a differing second subset of a plurality of options;
wherein options from which the first subset and the second subset are provided are defined by:

receiving at the platform for distributing content provided by a plurality of unrelated content providers an upload of the particular piece of content from a content provider for distribution, the received particular content being stored in a computer-readable memory;
providing an item user interface for defining access options for an individual content item that includes controls for selection, on an item by item basis: individual content items, one of a plurality of regions, and an option type for defining selectable access options for the particular content and other content items, the option type indicating a time period for access that begins upon the platform transmitting the particular content to the remote user via the network;
wherein for each of a plurality of content items for each of a plurality of regions, access options are specifically selected using the item user interface;
receiving at the platform a first selectable access option definition from the content provider via the item user interface defining first criteria for accessing the particular content in a first region in the plurality of regions, the first criteria including a first option type and the first region where the first option definition is valid;
receiving at the platform a second selectable access option definition from the content provider via the item user interface defining second criteria for accessing the particular content in a second region in the plurality of regions, the second criteria including a second option type that differs from the first option type and the second region where the second option definition is valid;
wherein first and second selectable access options are provided on a per item basis by a plurality of different content providers associated with different pieces of content;
receiving at the platform via the network an identification of an option in the first subset from the remote user;
automatically adjusting one or more of the first and second selectable access options without human intervention based on data regarding indexed access of the particular content by other remote users, wherein said automatically adjusting of the one or more of the first and second selectable access options for the particular content is further based on the remote user's account history regarding access of content other than the particular content including activity with such particular content associated with the other remote users on a website prior to access of the particular content and subsequent to the access of the particular content; and
transmitting the particular content from the platform to the remote user via the network according to a criterion of the option that the remote user has identified, wherein the particular content is transmitted from the platform to the physical location of the network for display on a graphical user interface of the user;
wherein a signal is transmitted from the platform to the remote user that disables access to the particular content at the conclusion of the time period for access associated with the identified option.

\* \* \* \* \*